US012700208B2

(12) United States Patent
Lilaonitkul et al.

(10) Patent No.: US 12,700,208 B2
(45) Date of Patent: Aug. 4, 2026

(54) COMPUTER-IMPLEMENTED METHOD OF ENHANCING OBJECT DETECTION IN A DIGITAL IMAGE OF KNOWN UNDERLYING STRUCTURE, AND CORRESPONDING MODULE, DATA PROCESSING APPARATUS AND COMPUTER PROGRAM

(71) Applicant: UCL BUSINESS LTD., London (GB)

(72) Inventors: Watjana Lilaonitkul, London (GB); Adam Dubis, London (GB); James Willoughby, London (GB)

(73) Assignee: UCL BUSINESS LTD., London (GB)

( * ) Notice: Subject to any disclaimer, the term of this patent is extended or adjusted under 35 U.S.C. 154(b) by 320 days.

(21) Appl. No.: 18/694,735

(22) PCT Filed: Sep. 22, 2022

(86) PCT No.: PCT/GB2022/052405
§ 371 (c)(1),
(2) Date: Mar. 22, 2024

(87) PCT Pub. No.: WO2023/047118
PCT Pub. Date: Mar. 30, 2023

(65) Prior Publication Data
US 2024/0404235 A1    Dec. 5, 2024

(30) Foreign Application Priority Data
Sep. 23, 2021    (GB) ..................................... 2113615

(51) Int. Cl.
*G06V 10/25* (2022.01)
*G06V 10/26* (2022.01)
*G06V 10/30* (2022.01)
*G06V 10/77* (2022.01)
*G06V 10/774* (2022.01)
*G06V 10/82* (2022.01)

(52) U.S. Cl.
CPC .............. *G06V 10/25* (2022.01); *G06V 10/26* (2022.01); *G06V 10/30* (2022.01);
(Continued)

(58) Field of Classification Search
CPC ........ G06V 10/25; G06V 10/26; G06V 10/30; G06V 10/7715; G06V 10/774;
(Continued)

(56) References Cited

U.S. PATENT DOCUMENTS

| | | | |
|---|---|---|---|
| 11,341,660 B1 * | 5/2022 | Garg ................. | G06Q 30/0603 |
| 2015/0055836 A1 * | 2/2015 | Moteki ................. | G06V 40/28 |
| | | | 382/124 |

(Continued)

OTHER PUBLICATIONS

Bhatkalkar et al., "Improving the Performance of Convolutional Neural Network for the Segmentation of Optic Disc in Fundus Images Using Attention Gates and Conditional Random Fields," IEEE Access, vol. 8, pp. 29299-29310, DOI: 10.1109/ACCESS.2020.2972318 (2020), 13 pages.

(Continued)

*Primary Examiner* — Ali Bayat
(74) *Attorney, Agent, or Firm* — ArentFox Schiff LLP; Daniel W. Clarke

(57) ABSTRACT

A computer-implemented method of enhancing object detection in a digital image of known underlying structure using pre-processed images with underlying structure and with any objects detected and bounding boxes inserted over the objects, the method comprising: extracting or generating images with the underlying structure but without objects detected as negative images; extracting images with the underlying structure and with an object detected as positive images; inputting pairs of negative and positive images through a feature extraction section in a neural network to extract feature vectors of the images; contrasting feature vectors of each pair of positive and negative images and thereby provide a contrast vector and gating the result to form an attention vector; processing the attention vector and the feature vector of the positive image to produce an output.

17 Claims, 19 Drawing Sheets

(52) U.S. Cl.
CPC ........ *G06V 10/7715* (2022.01); *G06V 10/774* (2022.01); *G06V 10/82* (2022.01); *G06V 2201/03* (2022.01)

(58) Field of Classification Search
CPC ................ G06V 10/82; G06V 2201/03; G06T 2207/10101; G06T 2207/20021; G06T 2207/20081; G06T 2207/20084; G06T 2207/30041; G06T 7/0012; G06T 7/194; G06T 2207/30028; G06T 2210/12
USPC ........................................................ 382/131
See application file for complete search history.

(56) References Cited

U.S. PATENT DOCUMENTS

| 2016/0364849 | A1* | 12/2016 | Liu | G06T 7/0004 |
| 2017/0337445 | A1* | 11/2017 | Baba | G06T 7/73 |
| 2019/0130231 | A1* | 5/2019 | Liu | G06V 10/82 |
| 2021/0042607 | A1* | 2/2021 | Yan | G06F 30/12 |
| 2021/0042917 | A1* | 2/2021 | Hirai | G06V 10/751 |
| 2021/0287054 | A1* | 9/2021 | Zhang | G06V 10/82 |

OTHER PUBLICATIONS

Gidaris et al., "Object Detection via a Multi-region and Semantic Segmentation-Aware CNN Model," 2015 IEEE International Conference on Computer Vision (ICCV), Santiago, Chile, 2015, pp. 1134-1142, DOI: 10.1109/ICCV.2015.135, 9 pages.

Liu et al., "Small-Object Detection in UAV-Captured Images via Multi-Branch Parallel Feature Pyramid Networks", IEEE Access, vol. 8, pp. 145740-145750 (2020), 11 pages.

Zhu et al., "Attention CoupleNet: Fully Convolutional Attention Coupling Network for Object Detection," IEEE Transactions on Image Processing, vol. 28, iss. 1, pp. 113-126 (2019), 14 pages.

* cited by examiner

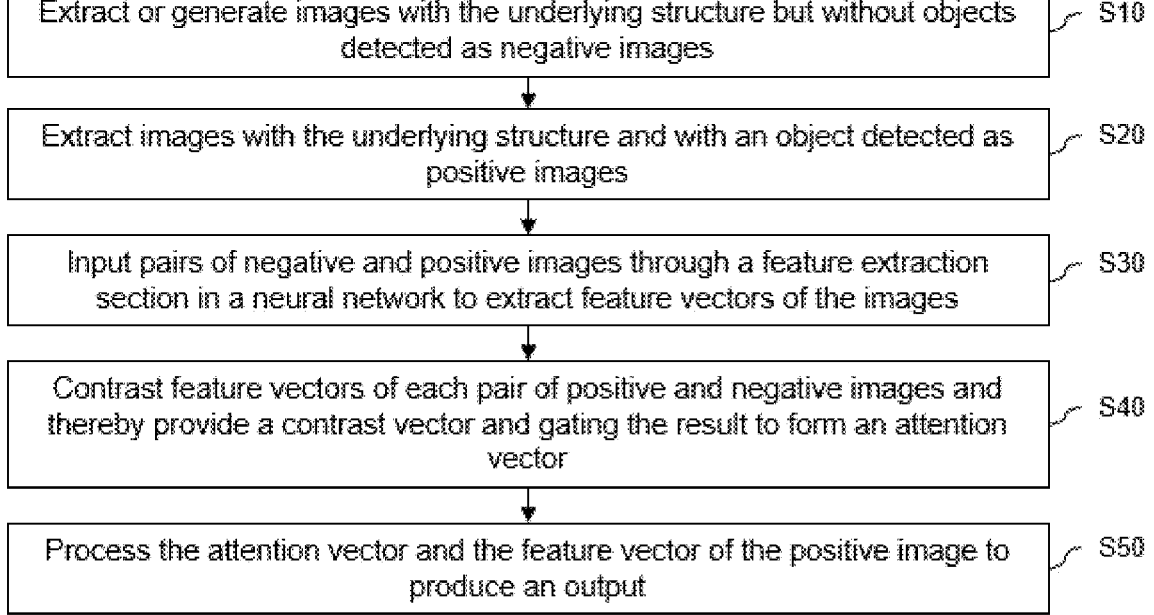

| | |
|---|---|
| Extract or generate images with the underlying structure but without objects detected as negative images | S10 |
| Extract images with the underlying structure and with an object detected as positive images | S20 |
| Input pairs of negative and positive images through a feature extraction section in a neural network to extract feature vectors of the images | S30 |
| Contrast feature vectors of each pair of positive and negative images and thereby provide a contrast vector and gating the result to form an attention vector | S40 |
| Process the attention vector and the feature vector of the positive image to produce an output | S50 |

Figure 1

| Functional Description | Layer Number | Input From | Computational Unit [(kernel size), stride] | Illustration Reference | Input Channels | Output Channels |
|---|---|---|---|---|---|---|
| Encoder | 0 | IN | ConvBlock [(3x3), 1] | Fig. 3a | 3(colour) OR 1(grayscale) | 32 |
| | 1 | 0 | ConvBlock [(3x3), 2] | Fig. 3a | 32 | 64 |
| | 2 | 1 | Bottleneck | Fig. 3b | 64 | 64 |
| | 3 | 2 | ConvBlock [(3x3), 2] | Fig. 3a | 64 | 128 |
| | 4 | 3 | BottleneckCSP | Fig. 3c | 128 | 128 |
| | 5 | 4 | ConvBlock [(3x3), 2] | Fig. 3a | 128 | 256 |
| | 6 | 5 | BottleneckCSP | Fig. 3c | 256 | 256 |
| | 7 | 6 | ConvBlock [(3x3), 2] | Fig. 3a | 256 | 512 |
| | 8 | 7 | BottleneckCSP | Fig. 3c | 512 | 512 |
| | 9 | 8 | ConvBlock [(3x3), 2] | Fig. 3a | 512 | 1024 |
| | 10 | 9 | BottleneckCSP | Fig. 3c | 1024 | 1024 |
| Contrastive Induced Gated Attention | 10* | 10 | CIGA | FIG. 7 | 1024 | 1024 |
| Spatial Pyramid Pooling | 11 | 10* | SPPCSP | Fig. 3d | 1024 | 512 |
| | 12 | 11 | ConvBlock [(1x1), 1] | Fig. 3a | 512 | 256 |
| | 13 | 12 | nn.Upsample | - | 256 | 256 |
| | 14 | 8 | ConvBlock [(1x1), 1] | Fig. 3a | 512 | 256 |
| | 15 | 13,14 | nn.Concat | - | 256, 256 | 512 |
| | 16 | 15 | BottleneckCSP2 | Fig. 3e | 512 | 256 |
| | 17 | 16 | ConvBlock [(1x1), 1] | Fig. 3a | 256 | 128 |
| | 18 | 17 | nn.Upsample | - | 128 | 128 |
| | 19 | 6 | ConvBlock [(1x1), 1] | Fig. 3a | 256 | 128 |
| | 20 | 18,19 | nn.Concat | - | 128, 128 | 256 |
| | 21 | 20 | BottleneckCSP2 | Fig. 3e | 256 | 128 |
| | 22 | 21 | ConvBlock [(3x3), 1] | Fig. 3a | 128 | 256 |
| | 23 | 21 | ConvBlock [(3x3), 2] | Fig. 3a | 128 | 256 |
| | 24 | 23,16 | nn.Concat | - | 256, 256 | 512 |
| | 25 | 24 | BottleneckCSP2 | Fig. 3e | 512 | 256 |
| | 26 | 25 | ConvBlock [(3x3), 1] | Fig. 3a | 256 | 512 |
| | 27 | 25 | ConvBlock [(3x3), 2] | Fig. 3a | 256 | 512 |
| | 28 | 27,11 | nn.Concat | - | 512, 512 | 1024 |
| | 29 | 28 | BottleneckCSP2 | Fig. 3e | 1024 | 512 |
| | 30 | 29 | ConvBlock [(3x3), 1] | Fig. 3a | 512 | 1024 |
| Detector | 31 | 22,26,30 | Detection Block [classes, anchors] | See description | 1024 | |

Figure 4

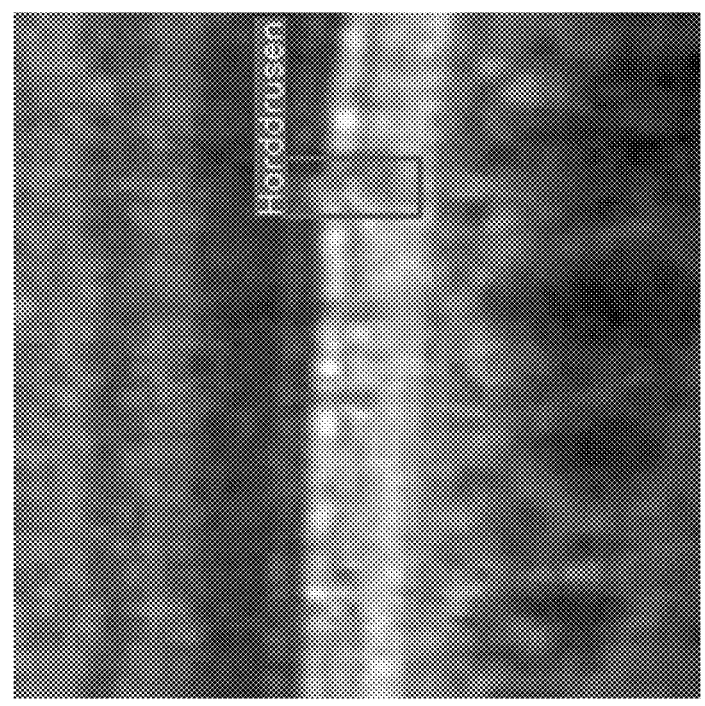
Figure 6

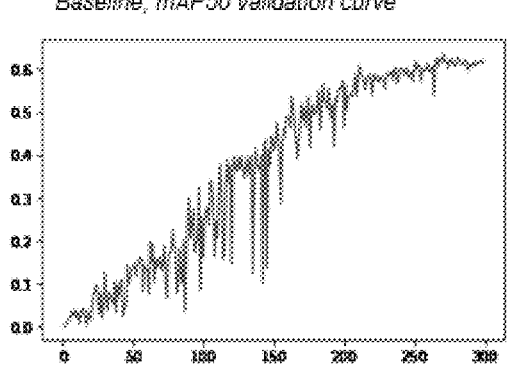
Figure 8a
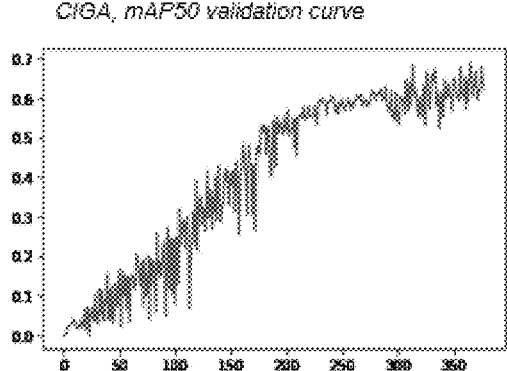
Figure 8b
| Metric | Baseline | Balanced | Straightened | CIA | CIGA |
|---|---|---|---|---|---|
| Validation mAP50 | 0.640 ± 0.003 | 0.687 ± 0.008 | 0.684 ± 0.039 | 0.691 ± 0.005 | 0.690 ± 0.016 |
| Validation mAP[50:95] | 0.345 ± 0.007 | 0.368 ± 0.012 | 0.367 ± 0.000 | 0.357 ± 0.001 | 0.371 ± 0.008 |
| Test mAP50 | 0.635 ± 0.010 | 0.639 ± 0.019 | 0.624 ± 0.019 | 0.627 ± 0.02 | 0.654 ± 0.023 |
| Test mAP[50:95] | 0.355 ± 0.010 | 0.353 ± 0.017 | 0.341 ± 0.02 | 0.350 ± 0.018 | 0.369 ± 0.007 |
| Choroidalfold | 0.545 ± 0.059 | 0.504 ± 0.167 | 0.477 ± 0.036 | 0.545 ± 0.117 | 0.555 ± 0.117 |
| Geographicatrophy | 0.686 ± 0.009 | 0.814 ± 0.024 | 0.675 ± 0.026 | 0.659 ± 0.042 | 0.761 ± 0.047 |
| Harddrusen | 0.647 ± 0.002 | 0.567 ± 0.065 | 0.591 ± 0.035 | 0.532 ± 0.071 | 0.545 ± 0.081 |
| Hyperfluorescentspots | 0.680 ± 0.021 | 0.716 ± 0.045 | 0.706 ± 0.026 | 0.695 ± 0.039 | 0.732 ± 0.049 |
| Prlayerdisruption | 0.635 ± 0.018 | 0.538 ± 0.018 | 0.538 ± 0.060 | 0.552 ± 0.078 | 0.712 ± 0.095 |
| Reticulardrusen | 0.567 ± 0.023 | 0.636 ± 0.046 | 0.628 ± 0.038 | 0.667 ± 0.038 | 0.550 ± 0.082 |
| Softdrusen | 0.725 ± 0.008 | 0.652 ± 0.046 | 0.649 ± 0.077 | 0.704 ± 0.081 | 0.692 ± 0.075 |
| Softdrusen-PED | 0.591 ± 0.009 | 0.634 ± 0.138 | 0.730 ± 0.044 | 0.690 ± 0.018 | 0.664 ± 0.066 |
Figure 9

| Metric | Baseline | Base Contrast Model | CIGA |
|---|---|---|---|
| Validation mAP50 | 0.754 | 0.792 | 0.783 |
| Validation mAP[50:95] | 0.463 | 0.478 | 0.497 |
| Test mAP50 | 0.751 | 0.781 | 0.787 |
| Test mAP[50:95] | 0.471 | 0.476 | 0.509 |

| Metric | Baseline | Base Contrast Model | CIGA |
|---|---|---|---|
| Validation mAP50 | 0.680 | 0.683 | 0.729 |
| Validation mAP[50:95] | 0.411 | 0.455 | 0.458 |
| Test mAP50 | 0.658 | 0.682 | 0.701 |
| Test mAP[50:95] | 0.406 | 0.455 | 0.459 |
| Benign | 0.799 | 0.807 | 0.772 |
| Malignant | 0.516 | 0.558 | 0.629 |

| Metric | Baseline | CIGA | | |
|--------|----------|---------|---------|---------|
| | | Trial 1 | Trial 2 | Trial 2 |
| Accuracy | 0.91 | 0.91 | 0.88 | 0.81 |
| TP/TP+FP | 0.04 | 0.17 | 0.47 | 0.71 |

| Class | YOLOv4 Baseline | YOLOv4 + CIGA | Improvement from CIGA |
|---|---|---|---|
| Overall | 0.201 | 0.262 | 30% |
| Car | 0.497 | 0.582 | 17% |
| Ghost | 0.091 | 0.165 | 81% |
| Motorbike | 0.012 | 0.039 | 325% |

COMPUTER-IMPLEMENTED METHOD OF ENHANCING OBJECT DETECTION IN A DIGITAL IMAGE OF KNOWN UNDERLYING STRUCTURE, AND CORRESPONDING MODULE, DATA PROCESSING APPARATUS AND COMPUTER PROGRAM

CROSS-REFERENCE TO RELATED APPLICATIONS

This application is a national stage application, filed under 35 U.S.C. § 371, of International Application No. PCT/GB2022/052405, filed Sep. 22, 2022, which claims the benefit of priority under 35 U.S.C. § 119 to GB Application No. 2113615.5, filed on Sep. 23, 2021, each of which is incorporated herein by reference in its entirety.

FIELD OF THE INVENTION

The present invention relates to methods of detecting objects in digital images. It is especially advantageous for small datasets but can be used with any digital image that has an underlying consistent structure that defines the background.

BACKGROUND OF THE INVENTION

This discussion takes the example of Optical coherence tomography (OCT) scans, but the applications of the inventions are not limited to this field. OCT scans are an increasingly useful imaging tool in, for example, ophthalmology. Robust computerised technologies assist in the automatic localisation of specific pathologies and automated analysis of such images with deep learning (DL) could help increase efficiency of clinical workflows. However, attaining high performance levels with DL on object detection tasks in OCT images is difficult as in many other areas of medical imaging. Difficulties include creation and labelling of large datasets (if possible), and development of solutions where the features that define the objects of interest are hard to distinguish, highly heterogeneous and the data sets available for DL training are relatively small.

In such cases, it is desirable to leverage the highly structured information in images to improve the accuracy of identifying and localising target regions on images. In the OCT example, the highly structured information may be referred to as "topological" in that it refers to the constant anatomical structure of a specific area or part of the body. In this sense an anomaly in a medical structure may be viewed as an object for detection separate from the constant structure. Other examples of underlying structure are the interior of a pipeline, a tunnel (for instance a train or road tunnel), or any part of another physical man-made structure (including flat or other shapes of surface and not limited to tunnels), which is explored using a camera or scanner to check for defects (objects or anomalies which are not desired parts of the structure).

Consider, for example, medical imaging. OCT scans are an imaging modality which is becoming increasingly prevalent. Since 2010 its usage in the diagnosis and treatment of Age-related macular degeneration alone increased around 250 times. OCT scanning is non-invasive but gives a clinician a large amount of information about the health of the layers of the retina, making in an indispensable tool in the diagnosis of retinal disease as well as for assessing of treatments in clinical trials. Detection and identification of small and subtle retinal abnormalities from OCT scans can allow for the early detection of diseases and can also allow for the assessment of severity. Accordingly, the development of automatic detection of these abnormalities would have the potential to streamline the diagnosis of retinal diseases and allow patients to receive appropriate treatment faster. Taking advantage of the large number of OCT scans stored as electronic health records, computer aided diagnosis (CAD) with DL backends have the potential to help increase the efficiency of OCT image analysis in clinical workflows and clinical trials. DL has had an extremely significant impact on the whole field of computer vision. However, its performance in medical modalities is limited by (i) a general lack of large medical training sets (ii) the objects of interest in medical imaging being very heterogeneous and having very subtle differences in their features. These issues serve to drastically reduce the robustness of the embeddings learned by a DL network and hence result in poor performance.

Much of the prior work on applying DL methods to the analysis of OCT scans focuses on the problems of automatic semantic segmentation which involves pixel-wise classification by the model to provide a localisation of target classes, or disease classification at the image-level. Object detection, where the task entails the identification and localisation of objects on images via the prediction of bounding boxes, presents a number of advantages over segmentation and classification. While classification networks may be able to achieve impressive results, the method is often more limited in its applicability and interpretability than those for object detection and segmentation, as the prediction output lacks localisation information. Segmentation models offer a lot of precision and detailed localisation information, but the labelling of segmentation datasets is incredibly tedious and time consuming, making training data very difficult to acquire. Object detection avoids this issue by being much simpler to label as the bounding boxes are comparatively simple to label, requiring only a class label and four coordinates for the bounding box. In addition to object detection datasets being easier to label, there is little prior work on object detection on OCT scans making this a much less explored area of study.

However, the fact that the bounding boxes are much easier to label for object detection does not make the overall task an easy one and the direct application of a state-of-the-art (SOTA) network may not give the level of performance required in high-stake tasks such as in medicine. There are a number of facets of OCT data which make the task of object detection much more difficult than in other scenarios. OCT images pose a difficult challenge for automated analysis methods due to the heterogeneity of images and the fine differences in features which indicate abnormalities. These issues are compounded by the additional complication whereby the abnormalities in question are frequently small in relation to the size of the image, which makes the defining features of the abnormality even harder to learn. Similar difficulties can occur in the man-made context mentioned above. Yet, it is desirable to detect these small-sized objects with high accuracy especially when object size is directly correlated to severity of the condition under study so that the ability to detect very small objects translates to capabilities for early detection of the condition.

DL-based object detectors can be broadly divided into two different classes: two stage and one stage detectors. These take different approaches to the central problem of predicting bounding boxes over objects. Two stage object detectors function by separating object detection into separate Region Proposal and Classification stages. This separation allows the network to focus in on the most likely region of the image to perform classification and bounding box regression on. One stage detectors instead perform the entire learning task as a single regression problem to learn the bounding box coordinates and classes. YOLO is one of the SOTA one-stage detector networks that works by sub-dividing an image into a number of grids and then having each grid perform classification and regression on the local region around it, allowing for object detection to be performed a lot faster than a two-stage network. The general trade-off between the two methods is that the inferencing time in one stage detection is faster than two stage detection but at the cost of accuracy as the region proposal step in two stage detection is time consuming but improves accuracy of detection. The difficulties of small object detection are also more pronounced in one stage detectors as compared to two stage detectors. But one stage detectors are still preferred especially in time-sensitive scenarios in certain medical workflows or in self-driving cars. Thus, there is great interest in methodologies that can improve detection performance in the faster one stage detectors.

This brings us back to the strategy of leveraging highly structured topological information within images to learn the distinguishing features of the anomalies to be detect as objects. Specifically, a very effective learning method to adapt for this strategy lies in contrastive representation learning. Contrastive representation learning is a form of representation learning based around learning a lower dimension representation of a dataset by means of comparing inputs. It is a popular method in computer vision when labelling is expensive as it does not rely heavily on labels to facilitate the training process. Often in contrastive learning settings, the model is supplied with pairs of similar or dissimilar inputs to learn a good representation of the dataset wherein maps of similar pairs are close together and maps of dissimilar pairs are far apart. However, known methods on contrastive learning that rely solely on the raw difference between the paired samples are susceptible to noisy signals resulting from any misalignment in the highly structured topological information that the method is looking to lever-age.

It is desirable to overcome the disadvantages of the prior art AI object detection. For example, it is desirable to accurately identify and localise target regions in images in AI object detection methods even when the object sizes can be small, highly heterogeneous and when the availability of training samples is limited.

SUMMARY OF THE INVENTION

According to an aspect of the invention, there is provided a computer-implemented method of enhancing object detection in a digital image of known (perhaps constant) under-lying structure using pre-processed images with underlying structure and with any objects detected and bounding boxes inserted over the objects, the method comprising: extracting or generating images with the underlying structure but without objects detected as negative images; extracting images with the underlying structure and with an object detected as positive images; inputting pairs of negative and positive images through a feature extraction section in a neural network to extract feature vectors of the images; contrasting feature vectors of each pair of positive and negative images and thereby provide a contrast vector and gating the result to form an attention vector; processing the attention vector and the feature vector of the positive image to produce an output.

The phrase "constant, underlying" here refers to the concept of something in the image that is going to be present in every image (although not necessarily in the same posi-tion) and can thus be used to ground the comparison, such as (in various medical fields) an RPE (retinal pigment epithelium) layer, a rib on an Xray or presence of the colon. The term "known" implies that at least the expert or operator of the network is aware of the underlying structure.

The method takes images with associated bounding box annotations (as appropriate) for object detection in a neural network.

From these images, the method extracts (from a dataset or even generates, such as from other images) images with the underlying structure but without any objects identified, so without any bounding boxes. These are referred to as negative images, in that there is no detection of an object.

The method further extracts images with the underlying structure and also with objects identified, so having associ-ated bounding box labels. These are referred to as positive images, in that there is positive detection of an object.

These positive and negative images are then paired (for example randomly, or maybe in a pre-prepared pair if a negative image is generated based on a positive image) and input into a feature vector section (or "backbone") of a neural network to extract feature vectors of the images (one per image).

The term feature vector is use here for familiarity, but includes the concept of a tensor, which is a vector or matrix of n-dimensions that represents all types of data. A feature vector is thus a representation of the image in n dimensions.

The method then contrasts the feature vectors of each pair of images. This contrasts the features of the two images. Simple subtraction may be used for this purpose, or an adjunct weight learning operation is another possibility. The result is a contrast vector.

This contrast vector is gated to form an attention vector. The term gating is used to refer to a process which highlights features that are important and diminishes features that are not important. The gating operation/unit may be viewed as a learnable unit that adjusts the values of the contrast vector to optimise the information contained in the resulting atten-tion vector. The adjustment can be an amplification or reduction of gains of the contrasting features in the contrast vector.

The attention vector and the feature vector of the positive image are then processed (combined) to produce an output. The output is an enhanced feature vector of the positive image. The output is produced for each positive image which is extracted from a dataset of images including bounding boxes, for example. This enhanced feature vector can then be processed as normal downstream in the neural network (for example in object detection).

Effectively the method uses contrasting to "remove" the features of the background underlying structure and then enhances the results of the contrast using gating. The under-lying structure is automatically removed using this method (and effectively need not be "known" to the network, at least not in advance of this step). The gating may have a signifi-cant effect in reducing errors in the contrasting due to misalignment of the images/underlying structure. The method can effectively increase the learning efficiency over smaller datasets and improve the detection of small objects that are normally hard to detect by standard object detection networks.

The method may further comprise, before extracting the images, dividing original images into tiles, each tile forming a potential image potential for including the underlying structure for input (although of course not all of the underlying present, or maybe even none of the underlying structure may be present on an individual tile). The number of tiles into which an original image is divided may be in the order of tens to hundreds, but this is of course heavily dependent on the dataset used. Tiles/original images may be selected for use in the method in dependence upon various factors such as incidence of (a) bounding box(es) in the tile or incidence of the constant underlying structure. They may be cropped and/or processed to make sure the underlying structure is aligned in each image, for example using masking.

Gating the contrasted feature vectors of the pair of positive and negative images may use any suitable method, usually implemented as a block (one or more layers) in the neural network, which is therefore learnable. This can therefore improve in performance throughout training, optimising the information contained in the attention vector. The adjustment can be an amplification or reduction of gains of the contrasting features in the contrast vector.

In one example, the gating block is a convolution block with a sigmoid activation function. This can act to optimise the attention vector. The overall effect may thus be to reduce the noise from potential misalignment of the underlying structure in the positive and negative image. Specifically, the convolutional block learns the direction and relative magnitude of adjustment, then the sigmoid layer normalises the range of adjustment approximately within a [0,1] range. A single convolution block may be provided for simpler tasks, but more may be provided in other scenarios.

Processing the attention vector and feature vector combines them in any suitable way. In one example, processing the attention vector and the feature vector of the positive image comprises multiplying the attention vector and the feature vector of the positive image to provide a gain vector and summing the gain vector and the feature vector of the positive image to produce the output as an enhanced feature vector.

The method features described herein can be provided as a part of a neural network, referred to elsewhere herein as a contrastive induced gated attention (CIGA) module and explained in more detail later. The module can be inserted at any suitable point in the neural network structure. For instance, the output of the method may be fed to a pooling layer of the neural network. In an inference phase, the CIGA module may be used optionally and negative samples for inference are required accordingly. It is not known if the test sample has any objects or if they do, what kind. If the test sample is also a negative sample, then no bounding box should be detected.

The method has wide application and is specifically advantageous in the medical field. Hence the underlying structure may be medical topological structure of a medical image of a body part and/or contain consistencies in spatial relations between objects in an image, such as objects within an organ or body parts.

In a specific example, if the images are of a retina, the images may be pre-processed before the method takes place to flatten the curve of the retina to standardise and enhance the spatial consistency of the retinal structures across the training samples.

The method may be carried out in a training phase of a neural network. In this case the training set may require re-balancing when there is significant imbalance in the number of instances in each class. For this, a weighting score as a function of the frequency of the instances of the object classes in the image may be used to select images for use in training. That is, an image containing a less frequently occurring class will be more likely to be used in the method.

The method can take place in any suitable neural network, including an R-CNN network or a development thereof. In some examples, the method is carried out in a YOLO network, which learns the bounding box and classification of the object in the bounding box in a single stage.

Embodiments of further aspects include a module in a neural network, the module being configured to carry out a method as variously described above (according to an embodiment). The module may be positioned in the neural network within or after an encoder module and before a pooling module, or in any other suitable position.

Embodiments of a still further aspect include a data processing apparatus comprising means for carrying out a method as variously described above.

Embodiments of another aspect include a computer program comprising instructions, which, when the program is executed by a computer, cause the computer to carry out the method of an embodiment. The computer program may be stored on a computer-readable medium. The computer-readable medium may be non-transitory.

Hence embodiments of another aspect include a non-transitory computer-readable medium comprising instructions, which, when the program is executed by a computer, cause the computer to carry out the method of an embodiment.

The invention may be implemented in digital electronic circuitry, or in computer hardware, firmware, software, or in combinations thereof. The invention may be implemented as a computer program or a computer program product, i.e., a computer program tangibly embodied in a non-transitory information carrier, e.g., in a machine-readable storage device or in a propagated signal, for execution by, or to control the operation of, one or more hardware modules. A computer program may be in the form of a stand-alone program, a computer program portion, or more than one computer program, and may be written in any form of programming language, including compiled or interpreted languages, and it may be deployed in any form, including as a stand-alone program or as a module, component, subroutine, or other unit suitable for use in a data processing environment.

The invention is described in terms of particular embodiments. Other embodiments are within the scope of the following claims. For example, the steps of the invention may be performed in a different order and still achieve desirable results.

BRIEF DESCRIPTION OF THE DRAWINGS

Reference is made, by way of example only, to the accompanying drawings in which:

FIG. 1 is a flow chart of a method for enhancing object detection in a digital image of known underlying structure using pre-processed images according to embodiments;

FIG. 4 is a table summarising an example YOLOv4 model with a contrastive induced gated attention module according to an embodiment;

FIG. 6 is a comparison between an image from the Pascal VOC dataset (left) and an OCT dataset in consideration (right);

FIG. 8a is a validation mAP50 curve for the baseline model on YOLOv4;

FIG. 8b is a validation mAP50 curve for the fine-tuning of the CIGA model on YOLOv4 following on from the baseline trained model;

FIG. 9 is a table of results from baseline tests and tests using methods according to embodiments;

DETAILED DESCRIPTION

FIG. 1 is a flow chart depicting a computer-implemented method of enhancing object detection in a digital image of known underlying structure according to aspects of embodiments of the present invention. The digital image is of (or has) a known underlying structure and are labelled with bounding boxes when objects of interest are present.

At S10, methods extract images with the underlying structure, which have no objects. Additionally or alternatively, these images may be generated. These images in which no objects are present are regarded as negative images.

At S20, methods extract images with the underlying structure, which do include objects. These images in which objects are present are regarded as positive images.

At S30, methods process both negative and positive images by inputting pairs through a feature extraction section within a neural network. In this way, the neural network may extract feature vectors (or tensors generally) of the images.

At S40, methods contrast (or perform subtraction upon) feature vectors for pairs of positive and negative images. In this way, methods produce contrast vectors. The result is gated, so as to form attention vectors, thereby enhancing the important parts of the input data and fading out the remainder.

At S50, methods process the attention vector and the feature vector of the positive image and produce an output. The output may be further processed by the remainder of a neural network.

Methods according to embodiments improve (small) object detection in datasets in a manner that differs from existing methods in that the present invention detects objects better with a contrastive approach, leveraging the topological (or underlying in non-medical fields) structure of features within the image. Contrastive learning of pairs of normal and abnormal from, for example, OCT images focus the attention of the network towards abnormalities including small objects.

It is possible to extract "negative" tiles (or full images if no tiling has taken place) from datasets, which only contain context information and no object information (and, conversely, "positive" tiles may be considered to contain object information). Methods according to embodiments incorporate these tiles into DL networks, in order to allow networks to better identify the important features to learn.

The contrast induced attention branch functions by taking in a positive and negative sample as inputs and passes these images through some backbone network to extract feature vector representations of the two images. In an exemplary demonstration, the inventors have incorporated such a contrast induced attention branch into a CNN with a "You Only Look Once" (YOLO) backbone.

Figure 2:
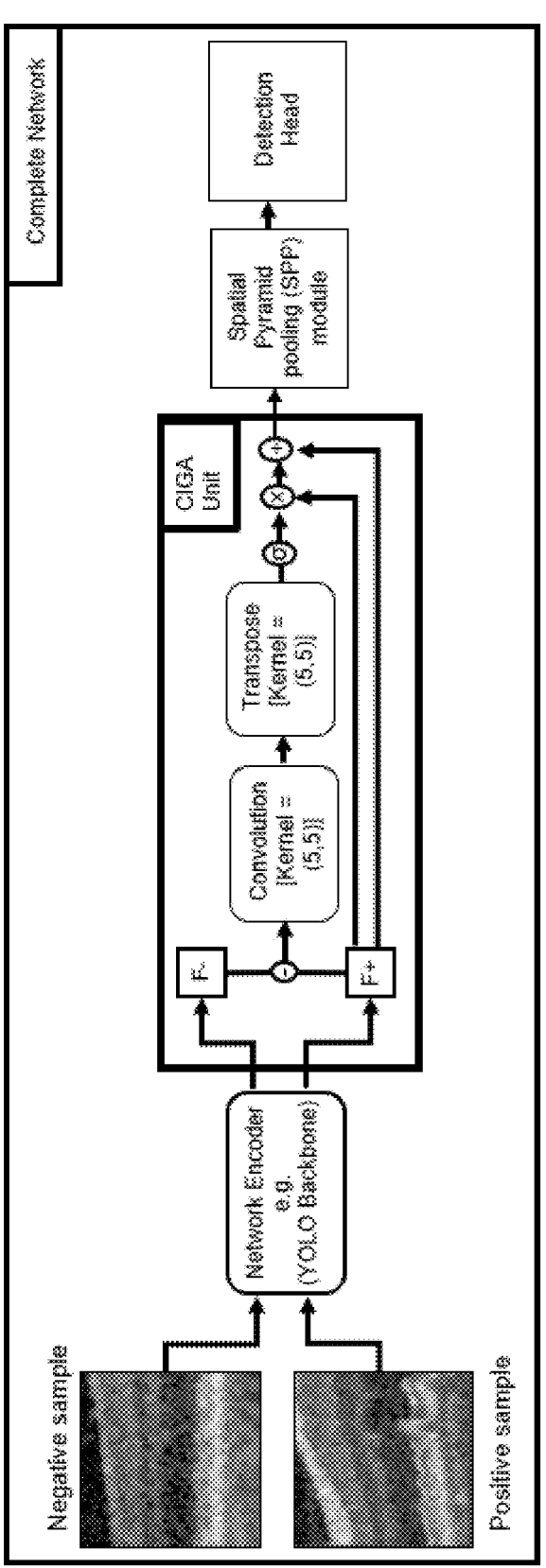
FIG. 2 is a schematic diagram of a contrastive induced gated attention (CIGA) module according to embodiments.

FIG. 2 shows the CIGA unit (bold frame) within the context of an entire network. CIGA is an architectural module which can be used with any object detection network to leverage the structured topology within the images to learn better features and improve predictive performance. This is achieved by passing a contrastive map between a positive sample feature (F+) and a negative sample feature (F−) before passing the map through a convolutional (Conv2d) layer, a transpose (ConvTranspose2d) layer, and an activation function such as the sigmoid function (sigma) to learn an attention map to gate the learned feature map of interest (F+). Methods according to embodiments produce positive features from positive samples, which contain objects of interest, and negative features from negative samples, which contain no objects of interest, via a Network Encoder, for example a YOLO backbone. The operations indicated in the image are all applied Element-wise.

Subtracting the two vectors directly may be used to contrast the features of the two images. This contrasted vector is then combined with the feature vector produced by the backbone of the main detection network and passed into the detection head. Within this combination step, the inventors include a convolution block with a sigmoid activation function. This inclusion is intended to reduce the impact of noise from misalignment of the features in the positive and negative tiles and the use of the sigmoid activation function ensures that the features are mapped to the (0,1) range, allowing for both feature damping and feature boosting.

In terms of the feature vectors produced by the model, the CIGA takes the feature vectors produced by the YOLO backbone from the positive and negative tiles, F+ and F−, and subtracts them, then applies convolution and sigmoid to create a gain vector $g_i \in (0,1)$. This vector may then be multiplied by a copy of the F+ to produce a gained vector $F_g = g \odot F_+$. This gained vector is then added to F+ to produce the final output of the CIGA module $F = F_+(1+g)$.

In an example implementation of this method, the inventors use the backbone of a YOLOv4 network to process both the positive and negative images as this ensures that the same steps are performed to extract the feature vectors and therefore that the contrast vector is directly applicable to the positive feature vector.

Figures 3A, 3B, 3C, 3D, 3E:
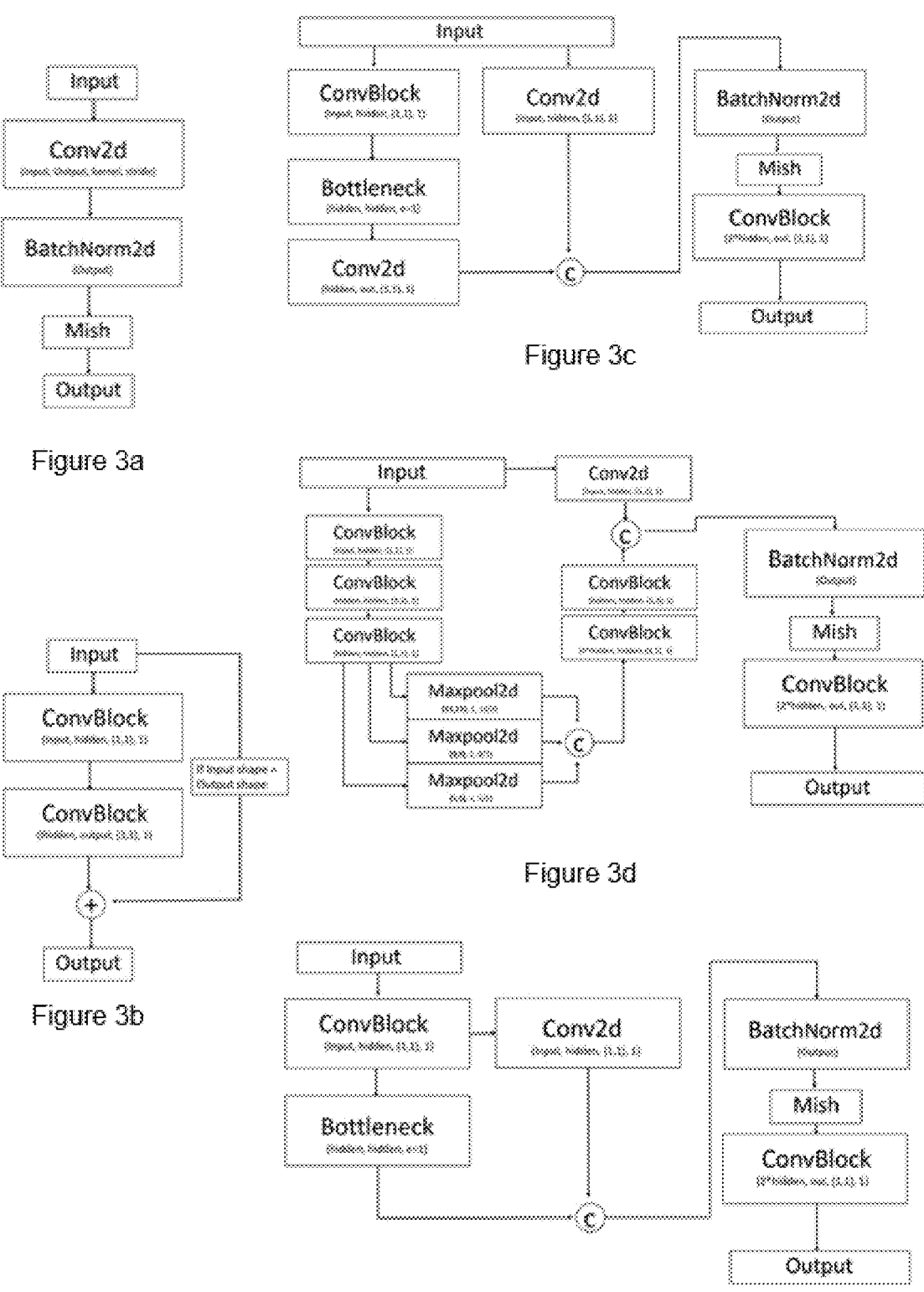
FIGS. 3a to 3e are schematic diagrams of computation units, in use in convolutional neural networks.

FIGS. 3a to 3e are schematic diagrams of computational block figures in use throughout CNNs, including in the backbone of a YOLOv4 network, and in a CIGA module in accordance with embodiments. FIG. 3a is a ConvBlock, comprising a 2-D convolution layer followed by a Batch Normalisation layer and a Mish activation. FIG. 3b is a Bottleneck comprising 2 blocks of ConvBlock (FIG. 3a) in sequence with a skip connection that adds the input tensor at the end when the input tensor and output tensor from the ConvBlocks have the same shape. FIG. 3c is a Bottleneck CSP block, which utilises the ConvBlock (FIG. 3a), the Bottleneck (FIG. 3b), Conv2D layers (2D Convolutions), Batch Normalisation and a Mish activation layer (note that "C" denotes Concatenation). FIG. 3d is SPPCSP block, which utilises combination sub-blocks built from the ConvBlock (FIG. 3a), Maxpooling layers at 3 different scales, Batch Normalisation, and Mish activation. FIG. 3e is a BottleneckCSP2, which utilises the ConvBlock (FIG. 3a), Bottleneck (FIG. 3b), Conv2d (2D-Convolution), Batch Normalisation, and Mish activation.

FIG. 4 is a table summarising a YOLOv4 adapted network (including a CIGA module, in accordance with embodiments). Note that each layer of the network is formed from a computational unit as illustrated in FIG. 3 and described above. In the case of the Detector, the following pseudocode explains an example operational block summary:

Define set of "anchor" bounding boxes
Define a number of outputs per anchor
Input of dimensions XxYxchannels
Generate an XxY grid
For each channel:
    Apply nn.Conv2d (in, anchors*outputs per anchor) layer
If training: return layer outputs
Else: apply sigmoid to layer outputs and translate relative to grid to fit to image Of course, the skilled reader will appreciate that the exact position of the CIGA module within a YOLOv4 (or, indeed, any other chosen) backbone is not critical to the operation of the contrastive learning techniques described herein. For instance, in the YOLOv4 adapted network case, positive results are seen for CIGA module positioning other than that depicted in FIG. 4. Preferably, the module is located towards the end of any encoder module; in this way, the CIGA module can improve the learning process during training so that the encoder module layers upstream can learn to produce better embeddings for the task.

Overall, with this CIGA network (or CIGA-enhanced network), contrastive learning may be used with gated attention in order to enhance the learning of object detection model by allowing models to learn from a gained version of the features of the image where the gain exhibits better resilience to noise from misalignment of input images.

Relative to existing contrastive attention methods, methods according to embodiments introduce an additional gating component into the feature comparison process to reinforce the model against noise and misalignment. Models in accordance with embodiments differ from prior methods in that (i) models in accordance with embodiments are used on object detection rather than multi-instance learning; and (ii) prior methods (for example, CIA-net) generate attention map by direct subtraction. This relies heavily on the alignment of data being accurate, whereas methods in accordance with embodiments use a gated attention method to reinforce against misalignment error by allowing models to learn on the difference in features and allowing for the attention map to be learned by the model rather than calculated at each iteration via a fix operation on the feature vectors.

The new module implemented in accordance with embodiments into the network architecture—the contrastive-induced-gated-attention module (CIGA)—aims to improve the performance of object detection networks with the aid of contrastive learning of abnormal features within the highly structured topology of the retina. This module contrasts abnormal samples with samples lacking any abnormality to enhance and improve the learning of abnormal features.

As an example implementation, with the aid of the CIGA module, one may observe incremental gains in object detection on OCT images taken from age-related macular degeneration (AMD) patients compared with a baseline generated using a SOTA object detection network YOLOv4.

Example Training & Testing Datasets

Figure 5:
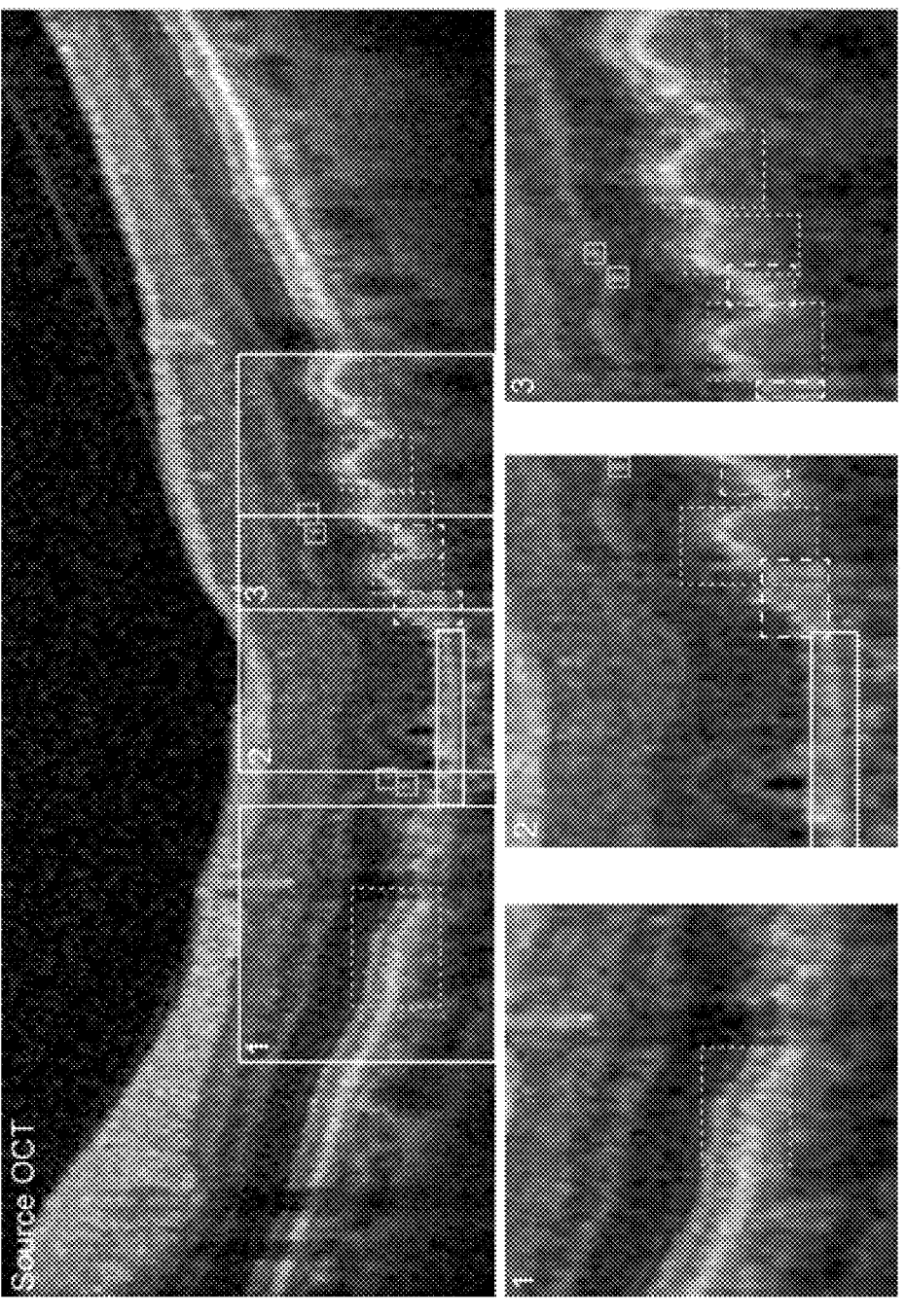
FIG. 5 is an example OCT image, including bounding boxes identifying objects from different classes, and including example tiles.

The example dataset under consideration here, which may be trained and evaluated using implementations according to embodiments, is a dataset of 232 OCT scans taken from AMD patients at Noor Eye Hospital in Tehran as described in the work of R. Rasti et al. AMD is an eye condition which is one of the most common causes of blindness in the world and the most common in Europe, generally affecting people over the age of 50 [see Rasti, R. et al. "Macular OCT Classification using a Multi-Scale Convolutional Neural Network Ensemble", IEEE Transactions on Medical Imaging, vol. 37, no. 4, pp. 1024-134 April 2018]. AMD has a number of markers which are visible on OCT scans, such as hard drusen, small aggregations of debris between the layers of the retina which are a common sight in OCT scans of AMD patients. Examples of a number of features are shown in FIG. 5. Here, hyperreflective spots are bound with solid grey lines (and are generally the smallest square indications, for instance those in the upper half of subpanel 3). Soft drusen are bound with dashed grey lines (for instance, the only bound region in subpanel 1). Hard drusen are bound with dashed white lines (for instance, the left-most bound region in subpanel 3). Geographic atrophies are bound with solid white lines (for instance, the left-most bound region in subpanel 2).

OCT images differ significantly from the images found in most publicly-available large object detection datasets such as MS COCO and Pascal VOC. These publicly-available imaging datasets typically contain hundreds of thousands of images, which are generally colour images of objects from tens of classes including people, animals, and vehicles among others. OCT images are in grayscale as opposed to colour, which causes them to contain significantly less information for computer vision tasks. In FIG. 6, one may see the difference between a typical OCT scan (right subpanel) and an image from the VOC dataset (left subpanel; note that the original is a colour image).

But there is a key qualitative difference between, for example, some medical imaging datasets and a COCO style image dataset that can potentially be leveraged to improve predictive performances from DL networks. Medical images (as just an example), over a fixed organ system and image view, will broadly adhere to the same underlying anatomical topology (or underlying structure) depicting the same or similar biological structures in relation to each other. For example, all OCT scans in consideration here depict the layers of the retina as a series of bands with a fixed order and all of the pathological objects of interest will occur mostly within specific regions within this fixed context. This is in stark contrast to COCO style image sets wherein there is no such fixed context to the images. This difference can allow for learning approaches based around common structural context which would not be possible on a COCO style dataset.

The CIGA model (or module or modification) according to embodiments may be attached to any standard object detection network architecture to provide increased performance provided the target dataset has sufficient topological structure for the contrastive learning module to be beneficial. The addition to the network does not have a significant impact on the computation complexity of the network overall adding only 17% complexity, which has a minimal impact on the inferencing speed of the network.

Bounding box annotations were obtained from an agreed label from three OCT experts. Any labelling convention may be used. In this example, the dataset consisted of images and labels where each object of interest in the image was labelled according to the Pascal VOC annotation convention. Each annotation included the class identity of the object and the coordinate values to define a bounding box around the object. The initial class distribution of the dataset is provided in Table 1 below.

TABLE 1

| Class distribution of source OCT dataset. | |
|---|---|
| Class | Objects |
| Hard Drusen | 718 |
| Soft Drusen | 568 |
| Soft Drusen & PED | 238 |
| PR Layer Disruption | 146 |
| Reticular Drusen | 137 |
| Geographic Atrophy | 74 |
| Choroidalfold | 47 |
| Hyper Fluorescent Spots | 47 |

As shown in Table 1, there were eight classes in the example dataset, with the most numerous being the hard drusen class. Hard drusen are small aggregations of debris in between the retinal layers which are common in OCT scans. These drusen are small and not individually a serious risk to eye health, although a large number of them may pose more of a risk to eye health. They have a small object size which should make them challenging to detect as objects despite the substantial number of examples in the dataset. These objects manifest on an OCT scan as a small deformation of the retinal pigment epithelium (RPE), the lowest bright band of the retina.

Performance Metrics

A key performance metric for assessing the output of models according to embodiments (and for the purpose of comparison) is the mean average precision (mAP). This metric is calculated from the precision and recall scores of the model which are given by:

$$Recall = \frac{True\ Positives}{True\ Positives + False\ Negatives} \qquad (Equation\ 1)$$

$$Precision = \frac{True\ Positives}{True\ Positives + False\ Positives} \qquad (Equation\ 2)$$

The true positives are determined based on two threshold values, the confidence threshold, $T_c$ and the overlap threshold, $T_o$. If a class prediction has a confidence value exceeding the threshold, then it is counted as a positive prediction and will have the accuracy of its bounding box assessed. The bounding boxes for each positive prediction are compared against the ground truth boxes and the intersection-over-union score (IoU) is calculated from:

$$IoU = \frac{Overlap}{Prediction + Ground\ Truth - Overlap} \qquad (Equation\ 3)$$

If the IoU score for any ground truth box exceeds the threshold, then the prediction is counted as a true positive and otherwise counted as a false positive.

The AP value is given by the area under a precision-recall curve, which one may generate by taking the precision and recall at several different confidence threshold values. Varying this and keeping the overlap threshold constant generates a curve from which one can calculate an area. This area is the AP score.

One may vary the overlap threshold to generate different metrics. This is indicated by writing the threshold percentage after the AP, such as AP50 or AP75. Lastly, to generate a mean AP value one may simply average the AP values across all classes in the dataset.

Two main versions of the mAP metric are used herein, which are mAP50 and mAP [50:95]. mAP50 is the mean AP50 as explained above and the mAP [50:95] is a more difficult test where the mAP values from 50 to 95 are taken in increments of 5 and then the average is calculated. Hence this metric gives an impression of the model's performance at higher precision.

Benchmarking

The inventors realised that inherently structured anatomical topology of a given imaging modality (or underlying structure for non-medical examples) can be leveraged to allow a CNN to learn a more robust embedding by contrasting pairs of normal and abnormal images and that this can be used to improve the performance of object detection on pathological features (or anomalies such as defects in non-medical images). Specifically, methods according to embodiments introduce a novel, learnable model, which gates attention based on contrastive learning.

As a proof of concept, the inventors evaluated this novel framework with the task of object detection over a set of pathological features in OCT images in a cohort of patients with AMD. To the best of the inventors' knowledge, this is the first study of its kind to apply an attention-based object detection model to OCT images.

It is useful to establish a benchmark for object detection performance on OCT scans based on one of the state-of-the-art (SAO) object detection networks, YOLOv4.

YOLOv4 is a state-of-the-art one stage neural network designed for object detection. This network provides a very high level of performance while also running at a high speed. YOLOv4 has been shown to be capable of achieving state-of-the-art accuracy and speed on the COCO dataset. Single-stage detectors have been reported to have comparatively poorer performance than two-stage detectors (e.g., Faster-RCNN) but are significantly faster at inference time. The speed of training and testing a model is extremely important in the creation of tools based in machine learning which gives YOLO high potential for use in application.

To optimise this baseline, the inventors identified several issues with detecting pathological objects on OCT images and implemented strategies to offset them:

(i) The pathological objects in question are few and they are small relative to the overall size of the image resulting in most of the image being background information. The inventors came to the realisation that implementing a tiling process on datasets enables reduction of this issue. This works by cropping the source images down to a smaller subset of the image which contains a label, thereby removing much of the background information and keeping the pathological information.

(ii) The dataset in consideration here is small relative to the size of computer vision datasets such as imagenet and MS COCO and one needs to prevent models from overfitting on the data one has. The inventors therefore (a) augmented the tiled dataset, and (b) implemented an early stopping and save-best model protocol, whereby the best-performing model on the validation set is updated throughout the training process and the training is stopped if a fixed number of iterations go by without performance improvement on the validation set. This allows to objectively obtain the best model without overfitting.

Figure 7:
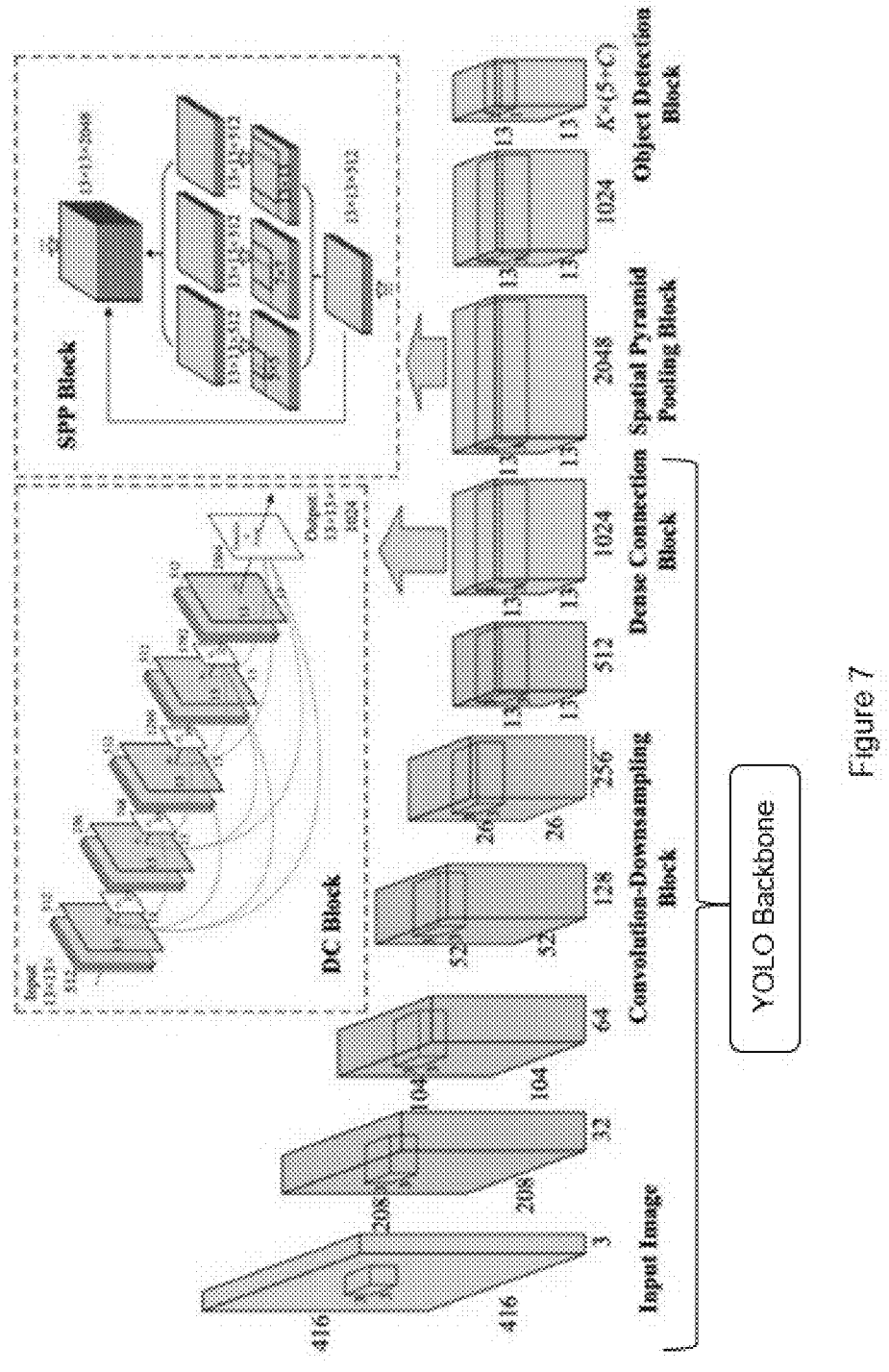
FIG. 7 is schematic diagram of an example of a YOLOv4 model structure.

FIG. 7 shows the structure of YOLOv4, showing the breakdown of the model into the separate stages. Highlighted is the backbone region of the model. The network consists of four sections: the convolution backbone; the feature pyramid; and the sparse and dense prediction heads. This figure is adapted from Zhanchao Huang and Jianlin Wang, DC-SPP-YOLO: Dense Connection and Spatial Pyramid Pooling Based YOLO for Object Detection, CoRR, abs/1903.08589 (2019).

The backbone is the feature extraction stage, which applies convolution and pooling to the input images and outputs feature space representations of the images. There are three feature representations which are fed into the feature pyramid stage of the network, and these are taken from different points along the convolution backbone. These feature representations will vary in resolution and global information content. The most convoluted feature map has the lowest resolution as much of the fine detail in the image has been lost but gives the best global information about the image as it has had the most convolution steps applied.

In the feature pyramid network this map, has convolution steps applied and is fed into the detection head to make a prediction. The network also copies this output and upsamples it to match the scale of the next layer in the pyramid. This processed map and the input map for the middle layer are concatenated produce a feature input which aims to leverage the global information contained in the lowest feature map and the higher resolution of the middle feature map to better inform the prediction made by the network. The same process is performed once again with the aim of improving the prediction made using the highest input map by incorporating global information from both the middle and lowest layers.

The pyramid structure aims to improve the flexibility of the network and importantly its ability to detect smaller objects. This is possible due to the higher resolution feature maps being combined with the global information of the lower resolution maps.

Lastly, the feature maps are fed into the detection head which applies convolution layers to convert the feature maps into the correct output shape. These outputs are then evaluated across three different criteria; class prediction accuracy, bounding box accuracy and object identification accuracy.

The objective function for the YOLOv4 loss is given by Equation 4:

$$LOSS = 1 - IoU + \frac{\rho^2(b, b^{gt})}{c^2} + \alpha\mu - \sum_{i=0}^{S^2}\sum_{j=0}^{B} I_{ij}^{obj} F(C_i) - \qquad \text{(Equation 4)}$$

$$\lambda_{noobj}\sum_{i=0}^{S^2}\sum_{j=0}^{B} I_{ij}^{noobj} F(C_i) - \sum_{i=0}^{S^2} I_{ij}^{obj} F(C_i) \sum_{c \in classes} F(p_i(c))$$

$$\text{where } F(x) = \hat{x}\log(x) + (1 - \hat{x})\log(1 - x).$$

This loss can be broken down into:

$$LOSS = LOSS_{CIoU} + LOSS_{Obj} + LOSS_{Class} \qquad \text{(Equation 5)}$$

The term $\rho^2(b, b^{gt})/c^2$ gives the ratio of the center-to-center and corner-to-corner distances of the ground truth and predicted bounding boxes. The remaining terms in LOSS-$_{CIoU}$ are:

$$\alpha = \frac{\mu}{1 - IoU + \mu'} \qquad \text{(Equation 6)}$$

$$\mu = \frac{4}{\pi^2}\left[\arctan\left(\frac{w^{gt}}{h^{gt}}\right) - \arctan\left(\frac{w}{h}\right)\right]^2 \qquad \text{(Equation 7)}$$

The Object and Class losses are calculated using the cross-entropy loss function applied to a summation over all the candidate boxes generated by the network. If there is no object, then the Object loss is the only one calculated and otherwise both the Class and Object losses are calculated. The term $\lambda_{noobj}$ is a weighting term used to reduce the contribution of the no-object part of the loss function.

The optimiser used in the training process is stochastic gradient descent and the training process used the cosine annealing learning rate scheduling where the learning rate at each epoch is given by the function:

$$lr_{i+1} = \left[0.4\left(1 + \cos\left(\frac{\pi}{E}\right)\right) + 0.2\right]lr_i \qquad \text{(Equation 8)}$$

where E is the maximum number of epochs to train for. Of course, other optimisers using other techniques are also suitable.

The initial learning rate used was 0.01 with a momentum of 0.937 and a weight decay of 0.0005. Again, of course, other initial parameters may be suitable.

Example methods developed by the inventors incorporate early stopping into the network, whereby the network will record the validation mAP50 of the model at each epoch and update the best model based on performance of this metric. By setting a threshold number of epochs, if the model trains for this many epochs without improving on the best model, the network stops. This inclusion prevents the model from overfitting and ensures that one is finding the maximum performance of the network in each run.

One potential issue with datasets such as the OCT dataset used is class imbalance, as the class distribution is very skewed, with one very numerous class and several less numerous classes. To offset this imbalance (here and generally), methods may implement weighting into the batch creation process wherein each image was weighted according to the classes of object it contained. This ensures that the batches fed into the network are more balanced than the overall dataset and that the model sees a wider variety of classes in the training process. This results in the "balanced" model, discussed shortly.

Data Pre-Processing

A major issue with this (and other example) dataset(s) is that the objects, which one wishes to identify are very small relative to the overall size of the image. This makes learning generally inefficient as the image features the network is attempting to learn make up a small percentage of the overall image features. One technique used to alleviate this problem is tiling, wherein the images from/on which one would like to learn are subdivided into tiles and a new dataset may be created by selecting all the relevant tiles for the learning task. In the new, tiled dataset the objects are now much larger relative to the overall size of the new images and most of the irrelevant information from the source dataset may be removed. To this end, methods according to embodiments may implement a tiling process for source images that would allow construction of a more learnable representation of the dataset.

In an example tiling process, methods may define a standard grid of tile candidates based on image size, to which methods may then applied several rules to reduce the candidate set down to only the useful tiles. For each image, methods may locate the relevant annotations and run an initial check on the bounding boxes to discard any duplicates and/or boxes with a significant overlap in their areas of coverage. As an example, all tiles from the initial set which did not meet the condition of having 60% coverage of any bounding box may be discarded.

Referring back to FIG. 5, three example tiles of a source OCT image are provided in the three subpanels. Note the relative increase in small feature size for the tiles in comparison to the source OCT image.

Application of this example tiling process to the example source dataset (OCT scans from AMD patients) creates a more refined representation, which may be used as the refined baseline dataset going forward.

TABLE 3

Class Distribution for Tiled Dataset

| Class | Objects |
|---|---|
| Hard Drusen | 886 |
| Soft Drusen | 286 |

TABLE 3-continued

Class Distribution for Tiled Dataset

| Class | Objects |
|---|---|
| PR Layer Disruption | 136 |
| Geographic Atrophy | 111 |
| Reticular Drusen | 86 |
| Choroidal Fold | 81 |
| Soft Drusen & PED | 47 |
| Hyper Fluorescent Spots | 31 |

In terms of additional augmentation on top of the tiling, saturation adjustment, x and y scaling of up to 20%, and left-right flipping were used in the present dataset. Of course, it is possible to additionally (or alternatively) include other augmentations (such as rotation).

With the tiling and augmentation pre-processing, methods are able to improve the performance of the object detection model by supplementing the limited sample size of the source dataset and increasing the relative size of the objects to allow for the model to learn good features more easily from the data.

Benchmarking Results

As an example benchmark, the inventors trained YOLOv4 on tiled patches to convergence, starting from different random initialisations and then took the best model as the baseline for comparison against the different training protocols and network architectures outlined herein. Detection across eight pathological classes was performed on patches of size 100×100, which were resized to 512×512, and each patch was selected to contain at least 60% of a bounding box within its area and/or 50% coverage of the retina to provide background information.

To evaluate performance gains from balanced sampling, image straightening, the CIA module and the CIGA module, the inventors used the final weights of the best YOLOv4 baseline model as the initialisation weights for each model and fine-tuned the weights to convergence. The same training process and hyperparameters were used unless otherwise specified. The values of the performance metric reported are the mean and standard deviation over a number of runs of the model in question. For each class, only the mAP50 value is reported for brevity.

To ensure that the models did not begin to overfit, the inventors tracked the training and validation accuracy and loss across the epochs. An example of the baseline validation mAP50 curve is shown FIG. 8a.

The example benchmarking results are summarised in the first two columns (benchmark, balanced) of the table in FIG. 9, which provides a model comparison table for all models tested (including models incorporating CIGA). All except the baseline were fine-tuned on the weights from a trained baseline model. Values reported are mean and standard deviation over a number of runs of each model. All class performances are mAP50 values and the best value in each class is bolded.

Note that the balanced model outperforms the baseline in test accuracy by 0.004 on the mAP50 metric however the performance gains were not consistent across all classes. The two smallest classes Soft Drusen-PED and Hyper Fluorescent Spots increased in performance on the balanced sampling model as we would expect. The performance on Geographic Atrophy and Reticular Drusen was also increased but the performance on Hard Drusen, Choroidal Fold, Soft Drusen and PR Layer Disruption decreased. This indicated that there is a complicated trade-of resulting from the class balancing. One potential source of a performance decrease is that the distribution of box sizes may have shifted dramatically as a result of the balancing. Hard and Soft drusen are the two largest classes, which will have been affected most by the balancing. Drusen are also typically smaller objects compared to the rest of the pathologies in this example study.

Figures 11, 12:
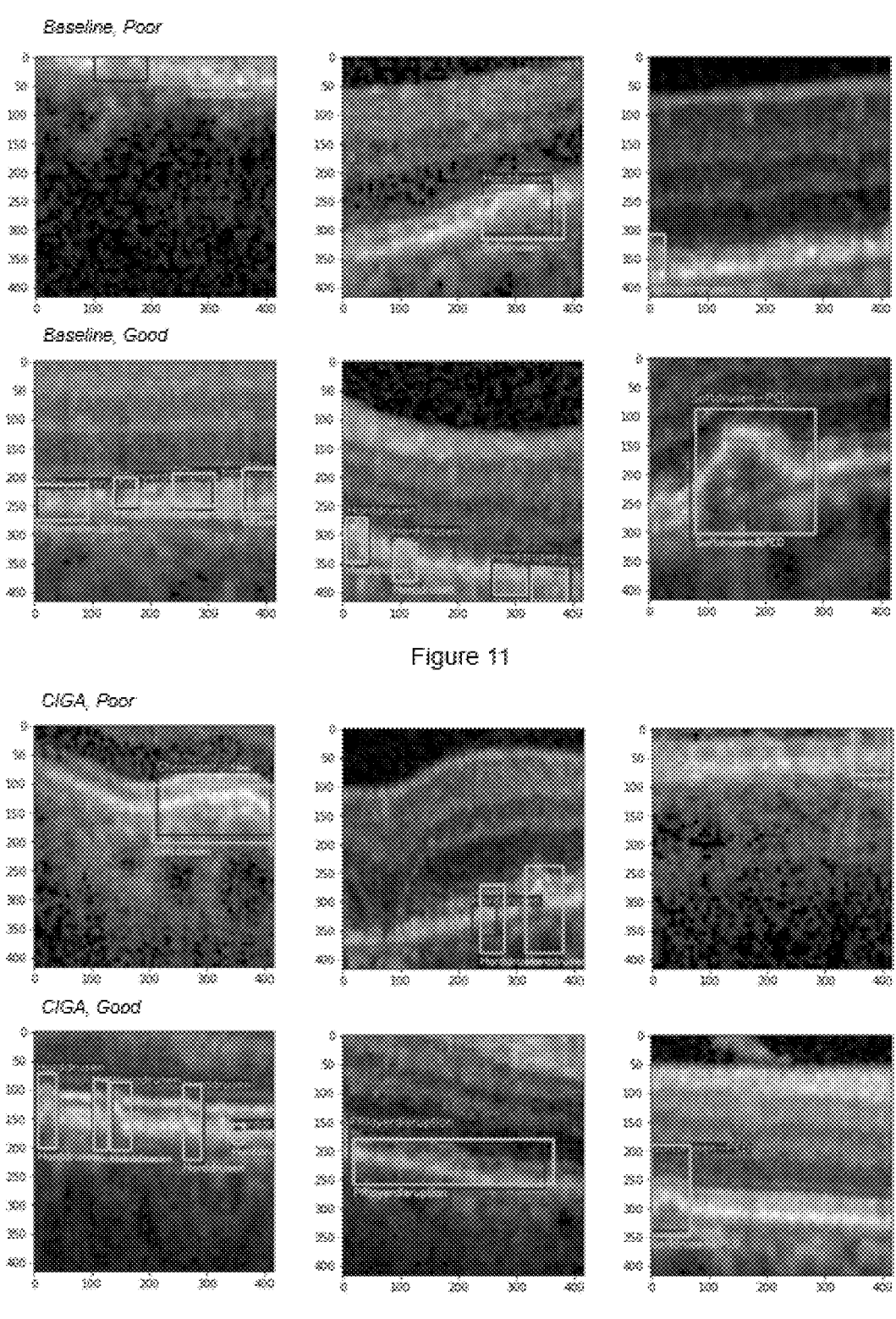
FIG. 11 is a comparison of good and poor small object detection results from a baseline model on an OCT dataset.
FIG. 12 is a comparison of good and poor small object detection results from a CIGA model on an OCT dataset according to an embodiment.

FIG. 11 shows examples of outputs from the baseline in comparison to ground truth boxes. There are a number of cases where the model performs very well at matching the ground truth box (bottom three tiles) but that there are also instances of the model performing poorly across all three possible failure cases, namely, incorrect classification, failure to identify an object and poor IoU with ground truth (top three tiles). In more detail, examples of the types of failure which occur include: poor intersection (top-left subpanel); poor classification (top-middle subpanel); and poor object identification (top-right subpanel).

CIGA Methodology

With this YOLOv4 benchmark established, it is then desirable to improve upon this benchmark (and the performance of prior art methods, such as that of CIA-net) by leveraging the general topological structure of OCT scans via a contrastive-induced gated attention mechanism according to methods according to embodiments.

Note that the main difficulties with automated analysis of medical images is the heterogeneity of the images and the lack of large training samples to enable the DL networks to learn robust embeddings. Methods according to embodiments improve this embedding by using the inherent anatomical topology of images to standardise them and then using contrast to focus the attention of the network, gating the output of this contrast to optimise the learning of features. Contrastive learning works by forcing a model to compare the sets of features from pairs of inputs. In order to reinforce its understanding of the core learning task, in the present case, one may provide the model with pathological and non-pathological images in order to reinforce the learning of features that differ the most significantly between the two. The DL architectural design according to embodiments allows for the attention map (or attention vector/tensor) to be learned flexibly to account for hard misalignments between the input pairs.

This approach directly targets the issue of heterogeneity by enhancing the contrast in the features of the pathological image which should allow features to be learned in a more robust manner.

For further comparison, prior art CIA architecture results are also provided. One other study has explored the use of contrastive attention in chest X-rays. In the work of J. Liu et al., the authors propose a network (CIAnet), which aims to better learn visualisations of chest X-rays by leveraging the structural similarity of the images. In this case the contrastive element of the network aims to enhance the generation of attention maps by directly comparing the feature vectors of pathological and non-pathological x-rays.

For even further comparison, results of a "straightened" model are also included. One of the vanishingly few advantages that medical images have over non-medical imaging datasets is that the images can have a highly-structured shared context, which can be leveraged to improve the embeddings learned by DL networks. In a COCO style image set it is important that the objects are pictured in many different contexts as this creates a realistic input scenario for the use case of a general object detection model. For object detection in medical imaging, the use case is very different, and the input scenario always includes the same shared context as the dataset. Given that one may know this fixed context, one may can eliminate any elements of variance in the dataset which amount to wholesale transformations of the shared context. In the OCT dataset in consideration here, for example, the shared context is the retinal bands, which are consistent across the dataset but have variance in their orientation or position in the image.

It is therefore desirable to eliminate these sources of variance with the aim of simplifying the learning process for the model without compromising any of the important information contained within the images and therefore improving model performance.

To remove the orientation variance in the present example dataset, methods may first feed source images into a segmentation network to extract a mask of the retina. Methods may perform some minor image processing steps on the masks to remove noise so that one is left with good representations of the retina. Once the masks are acquired, methods may then use them to produce a reference line indicating the curvature of the retina. Methods may then transform the source image according to this reference line to produce a straightened version of the source image. To produce this reference line, as an example, methods may simply take the masks which have been created and take the lowest point of the retina across the entire mask. To ensure that the position within the image is the same for the entire dataset, the transformation may be chosen to be the one that takes the reference line to a straight line across the middle of the image.

Once straightened images have been created, bounding boxes may be transformed accordingly with a conservative transformation process to ensure that the boxes still contain the transformed objects. Methods may then apply the processes (as above) to the images to extract the important regions with the additional step, such that methods also extract some "negative" tiles, which are sections of the retina with no objects present which will include information about the context only.

Overall, in the present example, this straightening process aims to emphasise the inherent retinal topology in OCT scans, which may allow models to learn a more robust representation of the network by itself and can also be used in a contrastive manner to supplement the learning of the network. Hence, this pre-processing procedure improves the performance of object detection on the example OCT data. Improve performance by reducing our dataset down to its shared context alone and eliminating useless features. The intent behind both pre-processing and straightening is to allow the model to learn a robust representation of the dataset by reducing the variance present without compromising the representation which it is desirable for the model to learn.

To summarise the straightening procedure, datasets may be transformed to increase the efficacy of contrastive learning. In this example, this is done by flattening OCT scans such that the retinal layers are straightened out in the images and cropped to roughly standardise the scale of the retina band across samples. From this flattened dataset, one may extract some tiles with no anomalies present which we are referred to as "negative" tiles.

Figure 10:
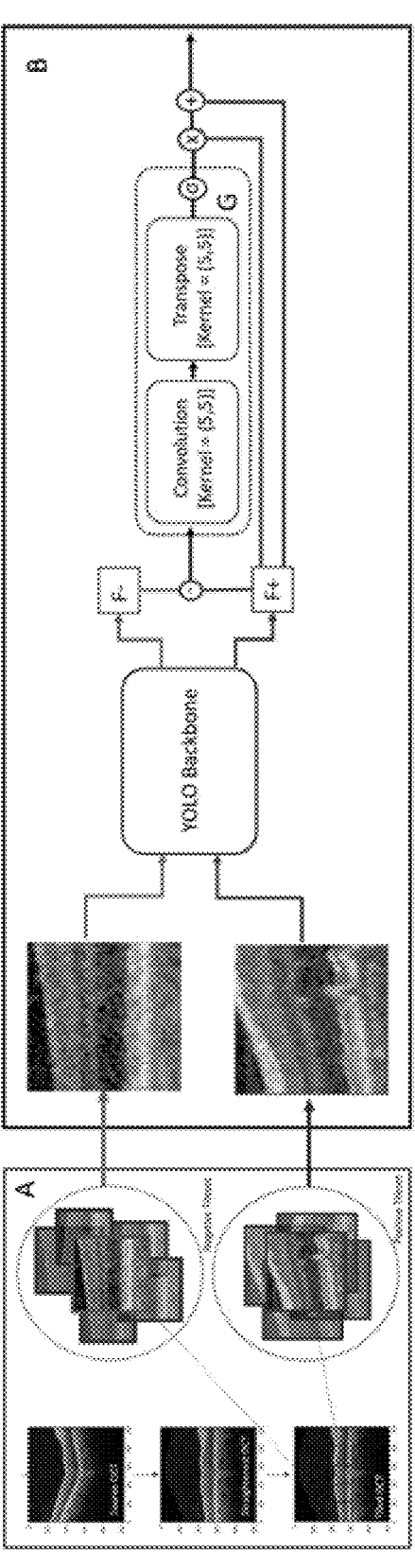
FIG. 10 is a schematic diagram of a CIGA module, including straightening and tiling according to embodiments.

FIG. 10 illustrates an example network architecture for a contrast induced gated attention (CIGA) model showing a straightening and tiling method in section A, which extracts positive and negative images and saves them to separate tile sets. Tiles from these sets are then fed into section B (the CIGA model), and herein the features of the positive tile (F+) and negative tile (F−) are extracted by the known YOLO backbone (see also FIG. 5). These features are subtracted and passed through the gating block G to produce a contrast vector. Methods then multiply a copy of F+ by the contrast vector to output the gain vector. The gain vector and F+ are summed and the output of B is [F+](1+gain), which may be fed into a Spatial Pyramid Pooling section of the network (again, see FIG. 7).

The results from taking the trained weights from the YOLOv4 baseline as the initialisation weights to fine-tune three models the straightened dataset model, the CIA model and the CIGA model are reported in the last three columns of the table in FIG. 9. As in the previous section ("Benchmarking results"), FIG. 9 reports the mAP50 values from fine-tuning he proposed models on a trained baseline. Taking the mean and standard deviation across a number of runs of each model gives the final values.

CIGA Performance Results

The CIGA model outperformed all other models in the test mAP50 and mAP [50:95] as hypothesised. The model demonstrated a 3% increase in mAP50 over the baseline YOLOv4 model. This model performed best in three of the eight classes; Choroidal Fold, Hyper Fluorescent Spots and PR Layer Disruption. An example of the CIGA model validation mAP50 curve is shown FIG. 8*b*.

FIG. 12 shows, in the bottom three subframes, examples of when the CIGA network performs well. In the top three subframes are examples where one may also see the model struggling in the three possible ways: poor classification (top-left subframe); poor IoU (top-middle subframe); and poor object identification (top-right subframe).

The straightened model reported the worst results of all the models tested. The test set performance on the straightened balanced model is 2% lower on the mAP50 than the baseline model. There is also a reduced performance on most individual classes compared to the baseline except for Hyper Fluorescent Spots, Soft Drusen-PED and Reticular Drusen, which are all in the four least numerous classes suggesting that the increased exposure due to balancing may be partially responsible for the increase in performance. A possible cause of the overall performance issue is that the straightening process by itself reduced the complexity of features that the network learned causing it to perform worse. However, when straightening is used as part of the contrastive learning process, one sees an increase of performance with the CIGA model but not with the prior art CIA model. Straightening helped to improve alignment for contrastive learning but failed in the CIA model as the operation to obtain the attention map by direct subtraction of the positive and negative sample features leaves the CIA module susceptible to noisy attention maps resulting from the tiniest misalignment of the anatomical structures.

The CIGA module design eliminates this susceptibility to noise due to slight mis-alignments by introducing the additional learnable gated layers imposed in the contrastive difference between the positive and negative paired samples.

The prior art CIA model underperformed relative to the baseline by 1.4% on the test mAP50. The model achieved better or equal performance compared to the baseline on the Hyper Fluorescent Spots, Soft Drusen-PED, Choroidalfold and Reticular Drusen classes, which are the four least numerous. This suggests that much of the improvement in performance is due to increased exposure to samples. The poor performance overall relative to the baseline might be due to the direct subtraction used in the CIA network, which, as discussed previously, is susceptible to noise from misaligned contrastive pairs. This hypothesis is supported by the fact that the CIGA, which uses gating to reinforce against this situation, achieved the highest performance on the test mAP50 and improved on the CIGA performance in six of the eight classes.

The results show that the CIGA model improves on the baseline by 3% on the testmAP50, achieving 0.654 as well as by 4% on the baseline test mAP [50:95], achieving 0.369. Methods according to embodiments also perform very well relative to the straightened and CIA models tested, which both underperformed compared to the baseline. The performance of the CIGA model confirms the hypothesis that the method of leveraging the anatomic topology of the data does indeed improve the accuracy of detecting pathological regions.

CIGA-OCT Data Efficiency

CIGA, when put to use for object detection in OCT images, demonstrates statistically significant performance improvements (using the mAP50 metric) on the baseline at both 50% of training data (p=0.01) and 25% training data (p<0.001).

Figures 13A, 13B, 13C, 13D:
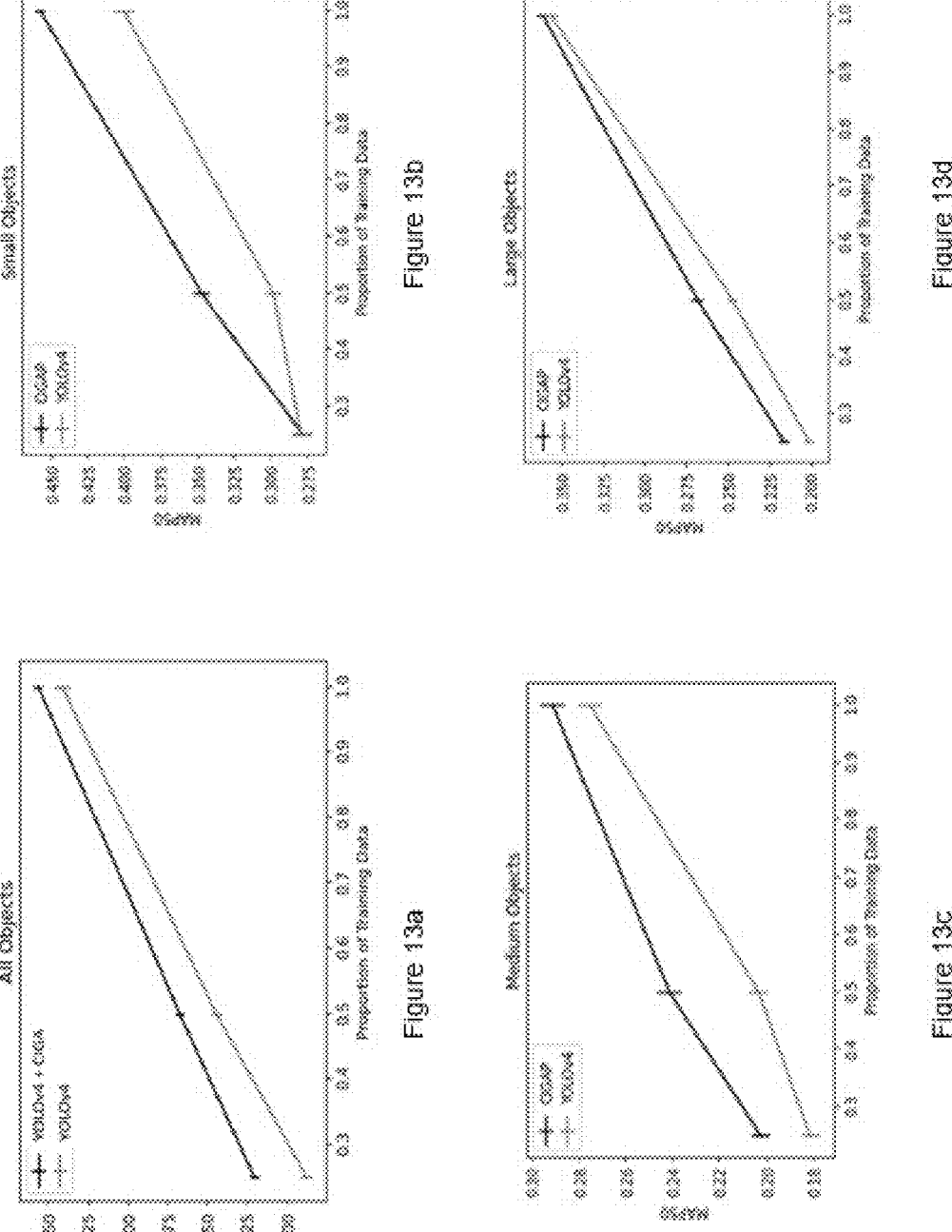
FIG. 13a is comparison of all sized object detection from a baseline model and from a CIGA model for varying proportions of training data.
FIG. 13b is comparison of small object detection from a baseline model and from a CIGA model for varying proportions of training data.
FIG. 13c is comparison of medium object detection from a baseline model and from a CIGA model for varying proportions of training data.
FIG. 13d is comparison of large object detection from a baseline model and from a CIGA model for varying proportions of training data.

FIG. 13*a* demonstrates an overall performance comparison at varying proportions of training data and compares the mAP50 metric scores for the baseline YOLOv4 model against a model with a YOLOv4 backbone and a CIGA module. For 100% training data, CIGA gives a mAP50 score of 0.355, baseline gives a score of 0.341; for 50% training data: CIGA gives a score 0.267, baseline gives a score of 0.244; and for 25% training data, CIGA gives a score of 0.22, baseline gives a score of 0.187.

FIGS. 13*b*, 13*b*, and 13*c* show, respectively, demonstrate a comparison of performance between the baseline and the CIGA model for small, medium, and large object detection. In respect of small, medium, and large object performance, the CIGA module outperforms the baseline on all categories at 50% data and performs equally well or better at 25% data.

This type of performance increase is important in, in particular, medical imaging, where dataset sizes are typically small, and illustrates how the CIGA module offers a boost in performance on small datasets. This also demonstrates that CIGA allows the network to learn more efficiently than the baseline, as shown from the fact that the overall margin of improvement widens at lower dataset sizes (see FIG. 13*a*).

Applicability to Other Imaging Modalities

Thus far, we have considered OCT datasets. Methods according to embodiments are equally suitable for datasets acquired using other imaging modalities.

Accurate small feature detection is also desirable for colonoscopy images, which may include polyps. The inventors additionally considered the HyperKvasir dataset, which comprises 1000 colonoscopy images featuring polyps and associated labels defining a bounding box around each polyp, and 1500 colonoscopy images with no pathological features. Example images from this dataset are visible in FIG. 14. This dataset is available under the Creative Commons Attribution 4.0 International License; no image modifications (aside from the illustrated feature detection) were performed [Borgli, H., et al. DOI: 10.17605/OSF.IO/MH9S; see https://osf.io/mh9sj/].

Figures 14, 15:
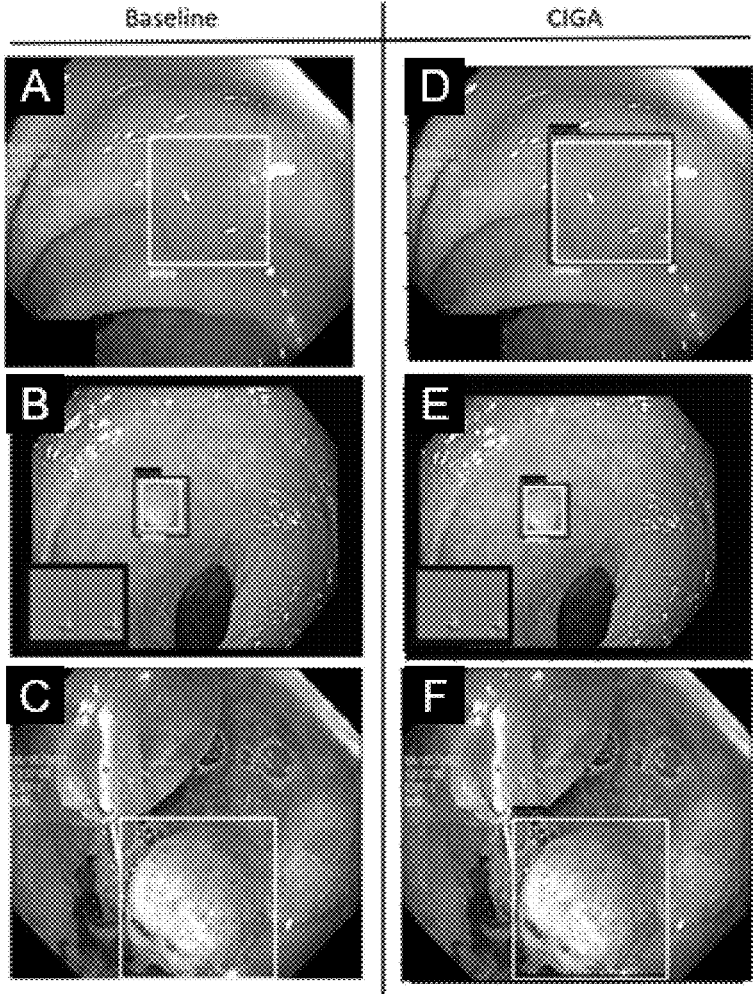
FIG. 14 is a comparison of small object detection from a baseline model and from a CIGA model on a coloscopy image dataset according to an embodiment.
FIG. 15 is a table summarising small object detection results for a colonoscopy image dataset.

A baseline YOLO model, base contrast model, and a model incorporating CIGA in accordance with embodiments was trained and trialed on the dataset. FIG. 14 provides a qualitative comparison between the performance of the CIGA and baseline YOLO models. Ground Truth boxes are shown in white and model predictions are shown in black. CIGA helps to improve performance in many ways, for example observe the reduction in false negatives (subpanel D versus A, F versus C) and tighter bounding box predictions (E versus B).

A quantitative comparison of the Baseline YOLO model, Base Contrast model, and CIGA evaluated on the pathological colonoscopy dataset is provided in the table in FIG. 15. Best values for each metric are displayed in bold.

Accurate small feature detection is also desirable for ultrasound images, which may include features indicative of tumours. The inventors additionally considered a dataset of breast ultrasound images, acquired as indicated in [Data in Brief. 2020 February; 28:104863. DOI: 10.1016/j.dib.2019.104863.] The dataset comprises 780 ultrasound images separated into benign, malignant, and normal classes. Bounding box annotations were created from the segmentation masks supplied with the dataset. Example images from this dataset are visible in FIG. 16. This dataset is available under CC0 1.0 Universal (CC0 1.0) Public Domain Dedication [Al-Dhabyani, W. et al., Dataset of breast ultrasound images. Data in Brief. 2020 February; 28:104863. DOI: 10.1016/j.dib.2019.104863].

Figures 16, 17:
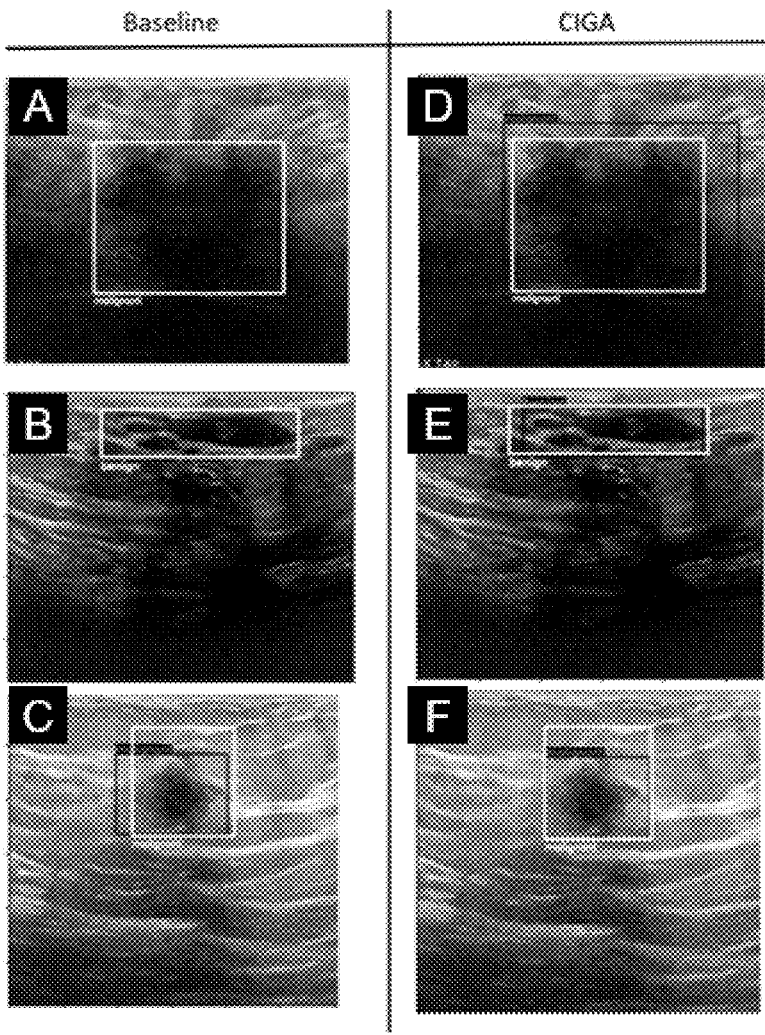
FIG. 16 is a comparison of small object detection from a baseline model and from a CIGA model on an ultrasound image dataset according to an embodiment.
FIG. 17 is a table summarising small object detection results for an ultrasound image dataset.

A baseline YOLO model, base contrast model, and a model incorporating CIGA in accordance with embodiments was trained and trialed on the dataset. FIG. 16 provides a qualitative comparison between the performance of the CIGA and baseline YOLO models Ground Truth boxes are shown in white and model predictions are shown in black. CIGA helps to improve performance in many ways, for example observe the reduction in false negatives (subpanel D versus A, E versus B) and tighter bounding box predictions (F versus C).

A quantitative comparison of the Baseline YOLO model, Base Contrast model, and CIGA evaluated on the ultrasound dataset is provided in the table in FIG. 17. Best values for each metric are displayed in bold.

For both ultrasound and colonoscopy imaging, the CIGA model in accordance with embodiments routinely outperforms the baseline models.

Figures 18, 19:
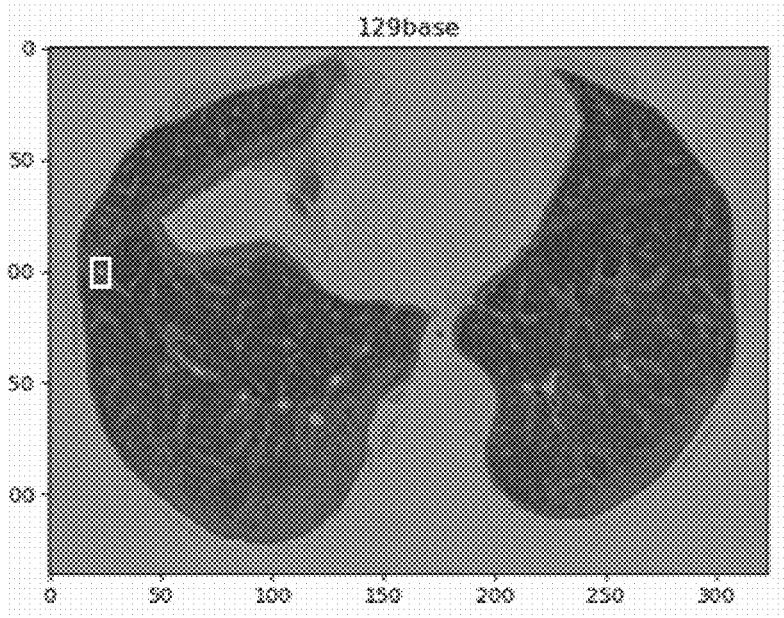
FIG. 18 is an example of lung nodule detection on a CT scan of an image.
FIG. 19 is a table summarising lung nodule detection results for a CT scan dataset.

Further, accurate small feature detection is also desirable for lung nodule detection. FIG. 18 provides an example lung CT image, with a nodule detected bound in a solid white lined box on the left-hand side. This example image is from the LUNA16 dataset, available under the Creative Commons Attribution 4.0 International License; no image modifications (aside from the illustrated feature detection) were performed [see https://luna16.grand-challenge.org/Data/]. When deployed on the problem of Lung Nodule Detection from CT scans, the inventors found that CIGA is able to provide a significant improvement in terms of False Positive (FP) reduction; when matching the accuracy of the baseline, the CIGA improved on the baseline True Positive (TP) rate by 4 times. When restricted to a more precise output, CIGA sees a more than 10 times improvement for a 3.3% performance loss. At a 10% performance loss, CIGA provides an FP rate improvement of 17 times. Accuracy and precision (see equation 2) comparison are provided in the table in FIG. 19.

Notably, the CT scan case uses a 3D detection network as a baseline and the CIGA may be readily installed into this network to provide performance benefits with no adjustment required to the module, demonstrating the flexibility of use of the CIGA module.

Of course, many imaging modalities used for non-medical images are equally suitable for treatment with models with the CIGA module. For example, Deng, X. et al. "Detection and location of dead trees with pine wilt disease based on deep learning and UAV remote sensing." *AgriEngineering*

2.2 (2020): provides example images of dead or diseased pine wood nematode trees, acquired using a 20 million pixel sensefly SODA UAV visible light camera (reproduced from 294-307). As with the above-discussed medical imaging modalities, these images include well-defined objects. CIGA is well-suited for tree detection data in that, as with medical imaging, the background and the object(s) of interest is (are) similar in most features.

Another example non-medical imaging dataset is the xView3: Dark Vessels data set (see https://iuu.xview.us/dataset). This dataset includes pairs of SAR raster images (the pairs representing different polarization signals: VV, and VH) in UTM projection at 10-meter pixel size. It is difficult to glean useful information from SAR imagery for identification and classification of vessels for a variety of reasons, including: image resolution, sensor incidence angle, vessel build material, radar cross section, wind/wave conditions, and the lack of ground-truth data (such as AIS) to corroborate analysis results. CIGA is well-suited to this application (for detection of vessels) in the sense that images are relatively similar to medical scenarios, with well-defined backgrounds.

Figure 20:
FIG. 20 is a set of four images from the HAGDAVS dataset, suitable for use with a CIGA model.

Another example non-medical imaging dataset, suitable for use with CIGA is the HAGDAVS dataset, comprising 83 height-augmented aerial photography images and corresponding vehicle multi-class masks, representing motorcycles, cars, and ghosts (where a "ghost" is a refers to semi-transparent vehicles which appear due to a vehicle being in motion when the photograph was taken). This dataset is available under the Creative Commons Attribution 4.0 International License; no image modifications (aside from the illustrated feature detection) were performed [see Ballesteros, J. R. et al. (2022). HAGDAVS Dataset (Version 1) [Data set]. Zenodo. https://doi org/10.6281/zenodo.6323712]. FIG. 20 shows four example images from the HAGDAVS dataset, where bounding boxes have been applied, indicating: detection of cars in dark grey (see, e.g., the bottom-right quadrant of the top-left image); detection of ghosts in light grey (see, e.g., the sole detection at approximate coordinates of [1300, 50] in the top-right image); and detection of motorbikes in black (see, e.g., the detection at approximate coordinates of [625, 250] in the top right image).

Figures 21A, 21B:
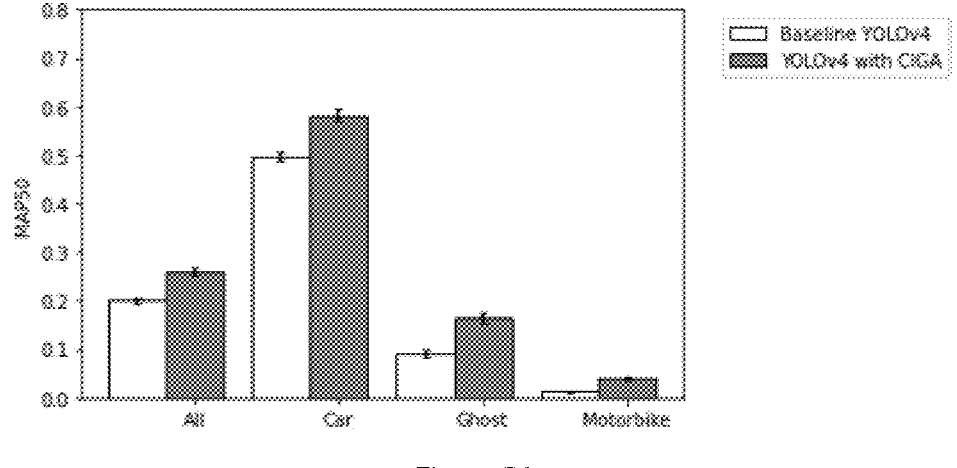
FIG. 21a is a graph summarising object detection results for the HAGDAVS dataset.
FIG. 21b is a table summarising object detection results for the HAGDAVS dataset.

FIG. 21$a$ is a graph demonstrating illustrating a performance comparison in terms of mAP50 between the baseline YOLOv4 network and the YOLOv4 with CIGA, when applied to the HAGDAVS vehicle detection dataset. FIG. 21$b$ is a corresponding table, providing the absolute performance of the models and the relative improvement CIGA-based techniques demonstrate over conventional techniques. Categories include: overall performance, Car class only, Ghost class only, Motorbike class only. As seen from both figures, overall (across all classes), a CIGA-based model demonstrates a 30% improvement on detection using a conventional YOLOv4 network architecture. Notably, ghost detections and motorbike detections are improved by 81% and 325%, respectively, when using a CIGA-based model. This demonstrates a proof of concept that the YOLOv4 with CIGA module is able to generate an improvement over the baseline YOLOv4 network in terms of mAP50 performance in all object classes on the HAGDAVS vehicle detection dataset.

Negative Image Generation

As described above, the computer-implemented method of enhancing object detection in a digital image of known underlying structure processes a negative image. The negative image may be extracted (from an image with underlying structure, where the extracted image has no detected objects) or may be generated. Suitable techniques for negative image generation include generation using generative adversarial networks (GANs), in which two neural networks content with one another where, for a training set, GAN techniques learn to generate new data with the same statistics as the training set.

In particular, GANs are well-suited to use cases where the sourcing and sampling of negative images is restricted (for instance, with medical imaging modalities). Ideally, the contrastive methods of CIGA require negative images to be as structurally similar to positive images (in pairs) as possible, to minimise the error incurred in the contrast from dissimilar macro- and micro-structural features between images. Suitable images for training and implementing a GAN include all of those images from the above described datasets (including HyperKvasir's colonoscopy images, LUNA16's lung nodule images, and Rasti, R. et al.'s OCT scans).

Figure 22:
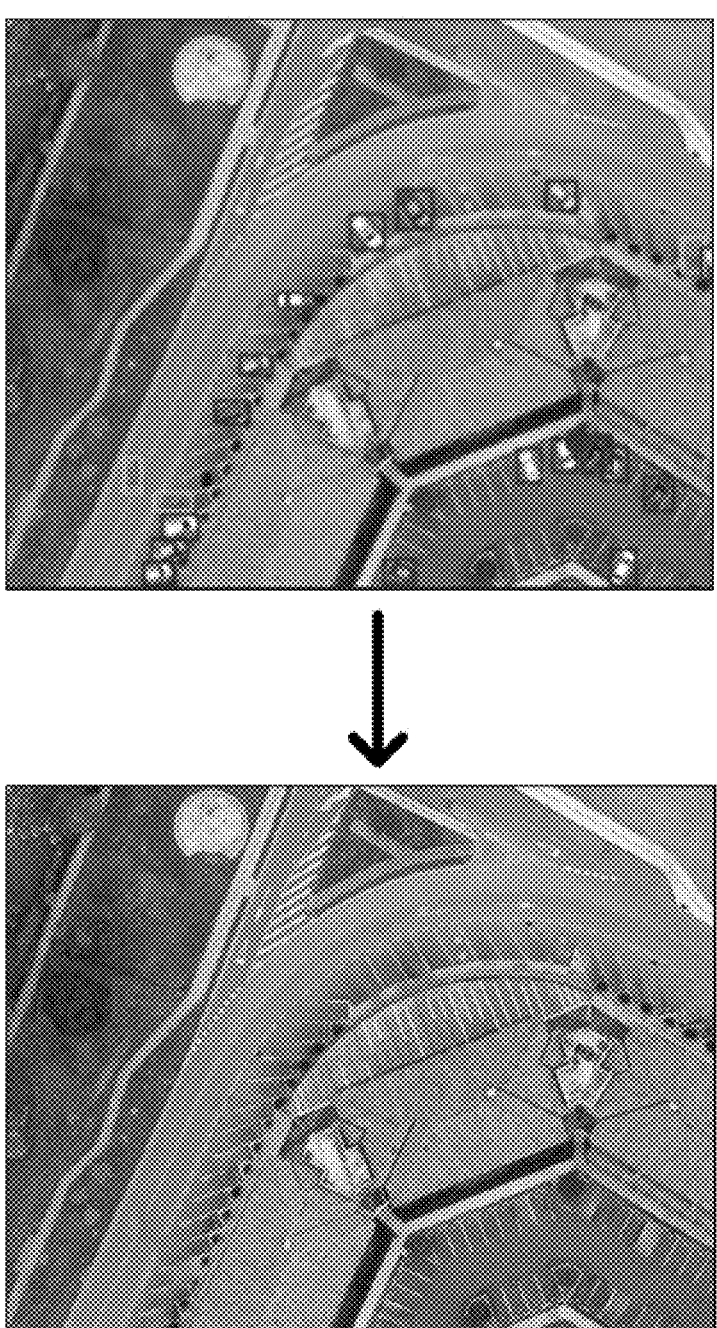
FIG. 22 is an example positive image and corresponding GAN-generated negative image.

FIG. 22 is an illustration of the results of GAN generation of negative image in the case of a non-medical imaging modality. On the left is the positive image (again, from the HAGDAVS dataset), which was fed into a GAN, with bounding boxes provided here only to illustrate the objects (that is, bounding boxes are not required in order for the GAN to produce a negative image). On the right is the resulting negative image output, which has had the objects removed.

In this example, the GAN used for negative image generation was the AOT-GAN outlined in Zeng, Y's "Aggregated Contextual Transformations for High-Resolution Image Inpainting" (see: https://arxiv.org/abs/2104.01431). This network is trained on the image data and then tasked with filling in all ground truth bounding boxes such that the objects are replaced with pixels similar to the background. That is, the GAN is able to "inpaint" sections of an image with background features. Here, the GAN is able to produce a set of negatives from the HAGDAVS images by tasking the GAN with "inpainting" all of the sections of the images which contained vehicles.

Figure 23:
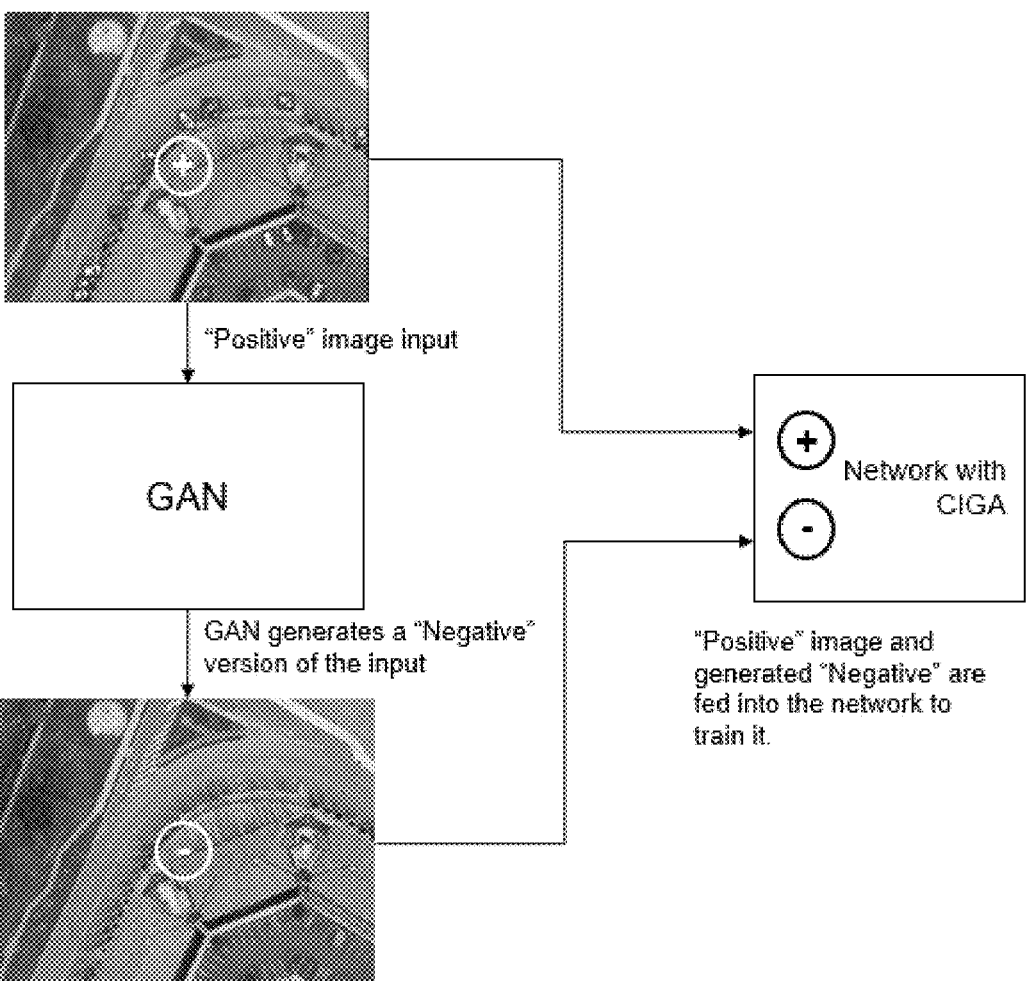
FIG. 23 is a schematic diagram of how GAN-generated negative images are processed in a CIGA model.

FIG. 23 is an illustration of the overall training procedure for the network with CIGA module when using the GAN-based negative image generation method. The positive image (+) is used as input into the GAN, which generates a negative version of the input image (−). Both images (+) and (−) are then used to train the network with the CIGA in accordance with the manner described above. The skilled reader will appreciate that various GAN architectures are suitable for the production of negative images, so long as they are capable of "inpainting" regions of positive images.

GAN negative generation is able to reduce error due to structural feature differences by ensuring that the negative is essentially identical to the positive in all regards except the pathological features.

GAN negative generation also ensures that, once the GAN is trained on a given image type, appropriate negatives may be sourced indefinitely for that image type, reducing the negative sampling restriction.

Hardware

Figure 24:
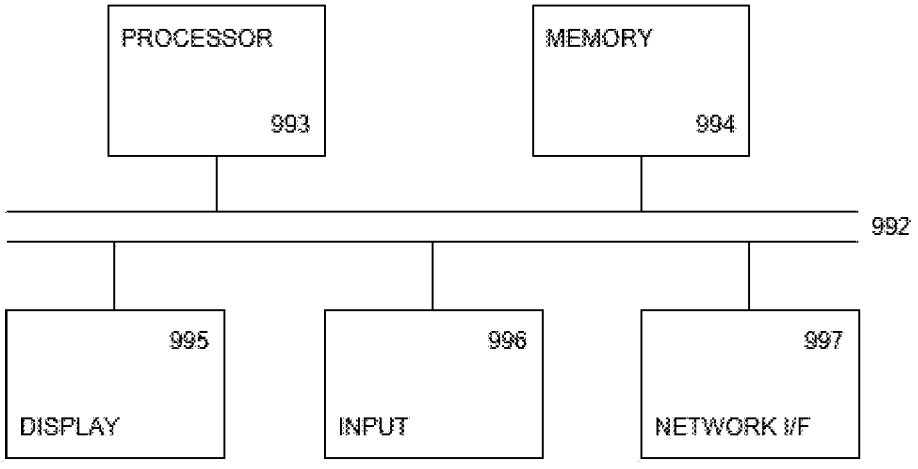
FIG. 24 is a diagram of suitable hardware for implementation of invention embodiments.

FIG. 24 is a block diagram of a computing device, such as a data storage server, which embodies the present invention and which may be used to implement aspects of the methods for enhancing object detection in digital images, as described herein. The computing device comprises a processor 993, and memory 994. Optionally, the computing device also includes a network interface 997 for communication with other computing devices.

For example, an embodiment may be composed of a network of such computing devices. Optionally, the computing device also includes one or more input mechanisms such as keyboard and mouse 996, and a display unit such as one or more monitors 995. The components are connectable to one another via a bus 992.

The memory 994 may include a computer readable medium, a term which may refer to a single medium or multiple media (e.g., a centralised or distributed database and/or associated caches and servers) configured to carry computer-executable instructions or have data structures stored thereon. Computer-executable instructions may include, for example, instructions and data accessible by and causing a general-purpose computer, special purpose computer, or special purpose processing device (e.g., one or more processors) to perform one or more functions or operations. Thus, the term "computer-readable storage medium" may also include any medium that is capable of storing, encoding, or carrying a set of instructions for execution by the machine and that cause the machine to perform any one or more of the methods of the present disclosure. The term "computer-readable storage medium" may accordingly be taken to include, but not be limited to, solid-state memories, optical media, and magnetic media. By way of example, and not limitation, such computer-readable media may include non-transitory computer-readable storage media, including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices).

The processor 993 is configured to control the computing device 400 and to execute processing operations, for example executing code stored in the memory 404 to implement the various different functions of the active learning method, as described here and in the claims.

The memory 994 may store data being read and written by the processor 993, for example data from training or segmentation tasks executing on the processor 993. As referred to herein, a processor 993 may include one or more general-purpose processing devices such as a microprocessor, central processing unit, or the like. The processor may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 993 may also include one or more special-purpose processing devices such as an application specific integrated circuit (ASIC), a field programmable gate array (FPGA), a digital signal processor (DSP), network processor, or the like. In one or more embodiments, a processor 993 is configured to execute instructions for performing the operations and steps discussed herein.

The network interface (network I/F) 997 may be connected to a network, such as the Internet, and is connectable to other computing devices via the network. The network I/F 997 may control data input/output from/to other apparatuses via the network.

Methods embodying aspects of the present invention may be carried out on a computing device such as that illustrated in FIG. 24. Such a computing device need not have every component illustrated in FIG. 24 and may be composed of a subset of those components. A method embodying aspects of the present invention may be carried out by a single computing device in communication with one or more data storage servers via a network or by a plurality of computing devices operating in cooperation with one another. Cloud services implementing computing devices may be deployed.

The invention claimed is:

1. A computer-implemented method of enhancing object detection in a digital image of known underlying structure using pre-processed images with underlying structure and with any objects detected and bounding boxes inserted over the objects, the method comprising:

extracting or generating images with the underlying structure but without objects detected as negative images;

extracting images with the underlying structure and with an object detected as positive images;

inputting pairs of negative and positive images through a feature extraction section in a neural network to extract feature vectors of the images;

contrasting feature vectors of each pair of positive and negative images and thereby provide a contrast vector and gating the result to form an attention vector; and processing the attention vector and the feature vector of the positive image to produce an output.

2. The method according to claim 1, further comprising: before extracting the images, dividing original images into tiles, each tile forming a potential image with underlying structure for input.

3. The method according to claim 2, wherein the tiles are pre-processed to align the underling structure.

4. The method according to claim 1, wherein gating the subtracted feature vectors of the pair of positive and negative images comprises:

using a gating block to provide a learnable block to optimise the attention vector and reduce the noise from potential misalignment of the underlying structure in the positive and negative image.

5. The method according to claim 4, wherein the gating block is a convolution block with a sigmoid activation function.

6. The method according to claim 1, wherein processing the attention vector and the feature vector of the positive image comprises:

multiplying the attention vector and the feature vector of the positive image to provide a gain vector and summing the gain vector and the feature vector of the positive image to produce the output as an enhanced feature vector.

7. The method according to claim 1, wherein the output is fed to a pooling layer of the neural network.

8. The method according to claim 1, wherein images are input from an encoder layer into the method.

9. The method according to claim 1, wherein the underlying structure is a medical topological structure of a medical image of a body part.

10. The method according to claim 1, wherein the underlying structure contains consistencies in spatial relations between objects in an image.

11. The method according to claim 10, wherein the wherein the objects in the image are objects within an organ or body parts.

12. The method according to claim 9, wherein the images are of a retina, and the images are pre-processed to flatten the curve of the retina.

13. The method according to claim 1, carried out in a YOLO network, which learns the bounding box and classification of the object in the bounding box in a single stage.

14. The method according to claim 1, carried out in a training phase of neural network, in which each image is weighted according to the number of classes of object included, and the weighting is used to select images for use in training.

15. A module in a neural network which is configured to carry out a method of enhancing object detection in a digital image of known underlying structure using pre-processed images with underlying structure and with any objects detected and bounding boxes inserted over the objects, the method comprising:

extracting or generating images with the underlying structure but without objects detected as negative images;

extracting images with the underlying structure and with an object detected as positive images;

inputting pairs of negative and positive images through a feature extraction section in a neural network to extract feature vectors of the images;

contrasting feature vectors of each pair of positive and negative images and thereby provide a contrast vector and gating the result to form an attention vector; and processing the attention vector and the feature vector of the positive image to produce an output.

16. The module of claim 15, wherein the module is positioned in the neural network after an encoder module and before a pooling module.

17. A data processing apparatus comprising: a memory; and a processor, wherein the memory comprises instructions for enhancing object detection in a digital image of known underlying structure using pre-processed images with underlying structure and with any objects detected and bounding boxes inserted over the objects, and the processor is configured to execute the instructions to:

extract or generate images with the underlying structure but without objects detected as negative images;

extract images with the underlying structure and with an object detected as positive images;

input pairs of negative and positive images through a feature extraction section in a neural network to extract feature vectors of the images;

contrast feature vectors of each pair of positive and negative images and thereby provide a contrast vector and gating the result to form an attention vector; and process the attention vector and the feature vector of the positive image to produce an output.

* * * * *